(12) United States Patent
Taira

(10) Patent No.: US 8,089,642 B2
(45) Date of Patent: Jan. 3, 2012

(54) IMAGE FORMING APPARATUS DRIVER, OPERATION SETTING DEVICE FOR IMAGE FORMING APPARATUS, IMAGE FORMING APPARATUS, AND IMAGE FORMING SYSTEM FOR POST-PROCESSING

(75) Inventor: Yoshiyuki Taira, Osaka (JP)

(73) Assignee: Kyocera Mita Corporation (JP)

( * ) Notice: Subject to any disclaimer, the term of this patent is extended or adjusted under 35 U.S.C. 154(b) by 971 days.

(21) Appl. No.: 11/974,230

(22) Filed: Oct. 12, 2007

(65) Prior Publication Data

US 2008/0088875 A1    Apr. 17, 2008

(30) Foreign Application Priority Data

Oct. 12, 2006  (JP) .................. 2006-278942
Oct. 12, 2006  (JP) .................. 2006-278943
Oct. 12, 2006  (JP) .................. 2006-278944
Oct. 12, 2006  (JP) .................. 2006-278945

(51) Int. Cl.
*G06F 3/12*    (2006.01)
(52) U.S. Cl. ......................... 358/1.13; 399/82
(58) Field of Classification Search ................. 358/1.13; 399/82

See application file for complete search history.

(56) References Cited

U.S. PATENT DOCUMENTS 6,336,011 B1 *  1/2002  Sumio et al. .................... 399/82

FOREIGN PATENT DOCUMENTS

| JP | 2002-287930 | 4/2002 |
| JP | 2002-241041 | 8/2002 |
| JP | 2006-174064 | 6/2006 |
| JP | 2006-209141 | 8/2006 |

* cited by examiner

*Primary Examiner* — Benny Tieu
*Assistant Examiner* — Qian Yang
(74) *Attorney, Agent, or Firm* — Gerald E. Hespos; Michael J. Porco

(57) ABSTRACT

An image forming apparatus for forming an image on a sheet based on image data and performing post-processing with respect to the sheet having the image, includes a post-processing designator for designating a post-processing side of a sheet bundle, and a post-processing position with respect to the post-processing side. The post-processing designator identifies four sides of the sheet based on combination information relating to combination of discrimination as to whether the post-processing side is a long side or a short side of the sheet, and discrimination as to whether the post-processing side is a left side, a right side, an upper side, or a lower side of the sheet, depending on whether the image to be formed on the sheet is a portrait image or a landscape image, and designates the post-processing side by using the combination information.

3 Claims, 19 Drawing Sheets

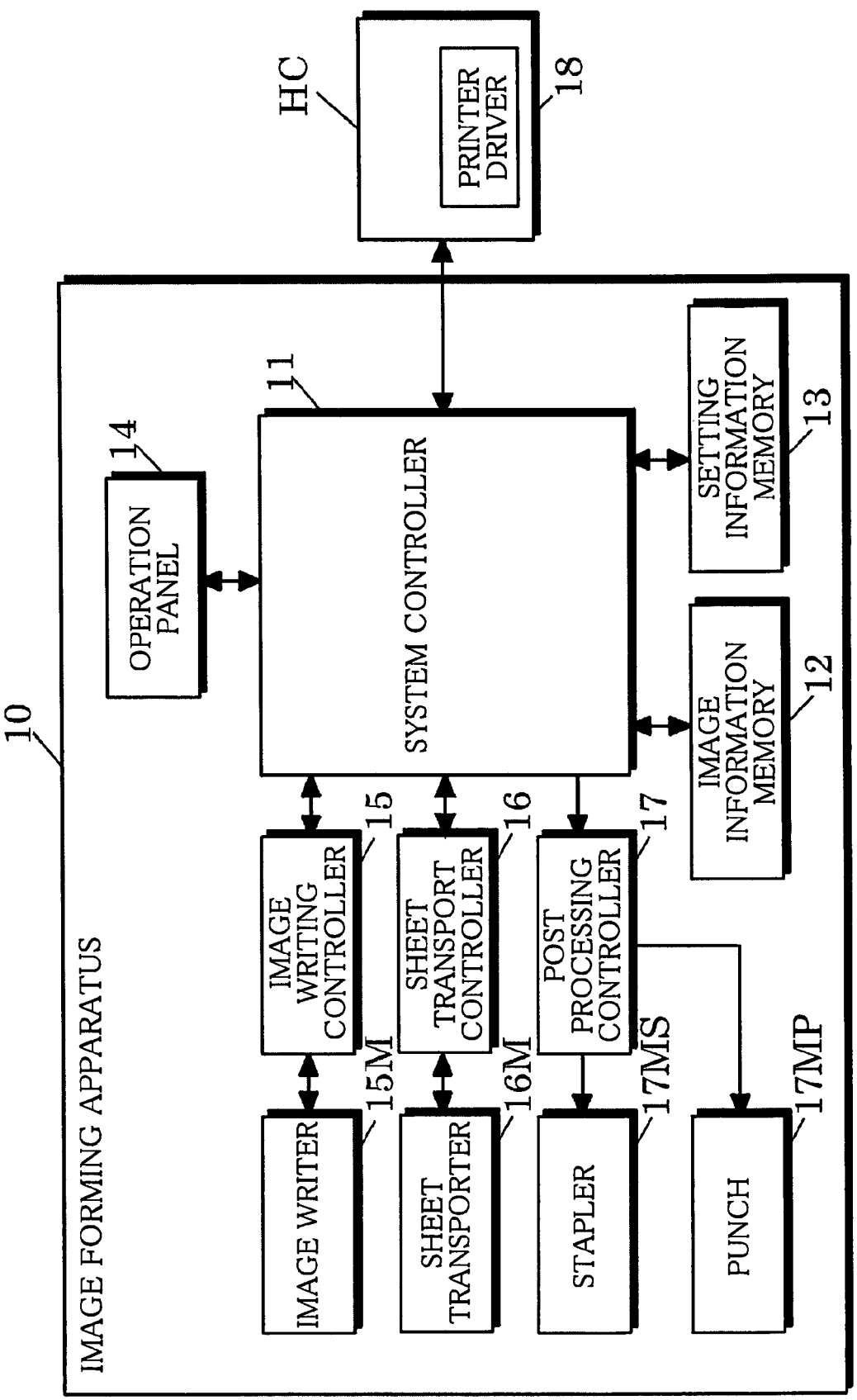

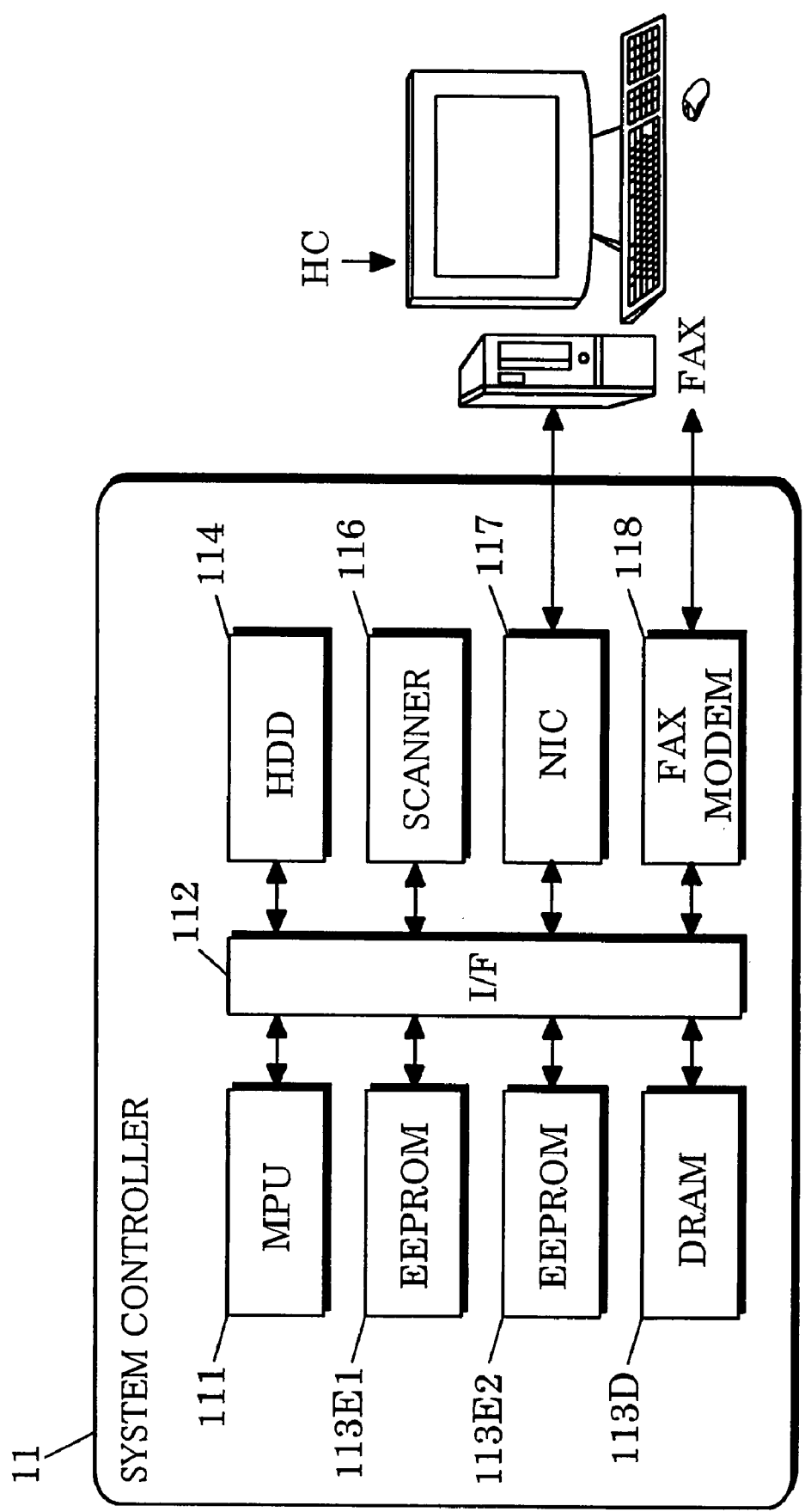

FIG. 4

POST PROCESSING SETTING CODE

| PRINTING DIRECTION | POST PROCESSING SIDE ID | STAPLING POSITION ID | PUNCH CODE | BINDING MARGIN (mm) | SHEET SIZE |
|---|---|---|---|---|---|
| DIR | EC | SC | PC | 10 | A4 |
| 0/1 | 0~4 | 0~3 | 0/1 | | |

DUPLICATE BEFORE UPDATING

| BINDING MARGIN ID |
|---|
| EC0 |

FIG. 5

PRINT SETTING

| BASIC | LAYOUT | POST PROCESSING | IMAGING | PRINT | JOB | DETAILS |

☑ POST PROCESSING SIDE
20
POSITION: LONG SIDE (LEFT) ▼
23

☑ STAPLING
21
POSITION: UPPER LEFT ▼
24
COUNT: ○ ALL  ◉ ◁▷ PER DESIGNATED NUMBER OF SHEETS

☑ PUNCHING
22
NUMBER OF HOLES: TWO HOLES ▼
25

☐ SEPARATE
METHOD: OFFSET JOB ▼

CUSTOMIZED SETTING
[MARGIN BETWEEN LEFT & RIGHT PAGES]

IMAGE  SETTING VALUE REFERENCE LIST    OK    CANCEL    APPLY
26B         27B                          28

26

PCL XL

| ITEM | CONTENTS |
|---|---|
| DISTRIBUTOR | AUTO SELECT |
| DESTINATION | TRAY A |
| PRINT DIRECTION | LONGITUDINAL |
| COPY NUMBER | 1 |
| INTEGRATE | NO |
| POSTER PRINT | NO |
| MAGNIFICATION | 100% |
| DOUBLE SIDED PRINT | NO |
| STAPLING | UPPER LEFT |
| PUNCHING | TWO HOLES |
| SHEET SIZE | A1 |

| POST PROCESSING SIDE | EC | SETTING BY USER | SET LEAD END OF SHEET AS POST PROCESSING SIDE |
|---|---|---|---|
| SHORT SIDE (UPPER) | 1 | UPPER LEFT — MIDDLE — UPPER RIGHT (1, 2, 3 along top) | (image as-is) TRANSPORT DIRECTION ↑ |
| LONG SIDE (RIGHT) | 2 | UPPER RIGHT (1), MIDDLE (2), LOWER RIGHT (3) | ROTATE IMAGE COUNTERCLOCKWISE BY 90° TRANSPORT DIRECTION ↑ |
| SHORT SIDE (LOWER) | 3 | LOWER LEFT — MIDDLE — LOWER RIGHT (3, 2, 1 along bottom) | ROTATE IMAGE BY 180° TRANSPORT DIRECTION ↑ |
| LONG SIDE (LEFT) | 4 | UPPER LEFT (3), MIDDLE (2), LOWER LEFT (1) | ROTATE IMAGE CLOCKWISE BY 90° TRANSPORT DIRECTION ↑ |

FIG. 8

| POST PROCESSING SIDE | EC | SETTING BY USER | SET LEAD END OF SHEET AS POST PROCESSING SIDE |
|---|---|---|---|
| LONG SIDE (UPPER) | 1 | UPPER LEFT / MIDDLE / UPPER RIGHT (1...2...3) | (1...2...3) TRANSPORT DIRECTION ↑ |
| SHORT SIDE (RIGHT) | 2 | UPPER RIGHT (1) / MIDDLE (2) / LOWER RIGHT (3) | ROTATE IMAGE COUNTERCLOCKWISE BY 90° — TRANSPORT DIRECTION ↑ |
| LONG SIDE (LOWER) | 3 | LOWER LEFT / MIDDLE / UPPER LEFT (3...2...1) | ROTATE IMAGE BY 180° — TRANSPORT DIRECTION ↑ |
| SHORT SIDE (LEFT) | 4 | UPPER LEFT (1) / MIDDLE (2) / LOWER LEFT (3) | ROTATE IMAGE CLOCKWISE BY 90° — TRANSPORT DIRECTION ↑ |

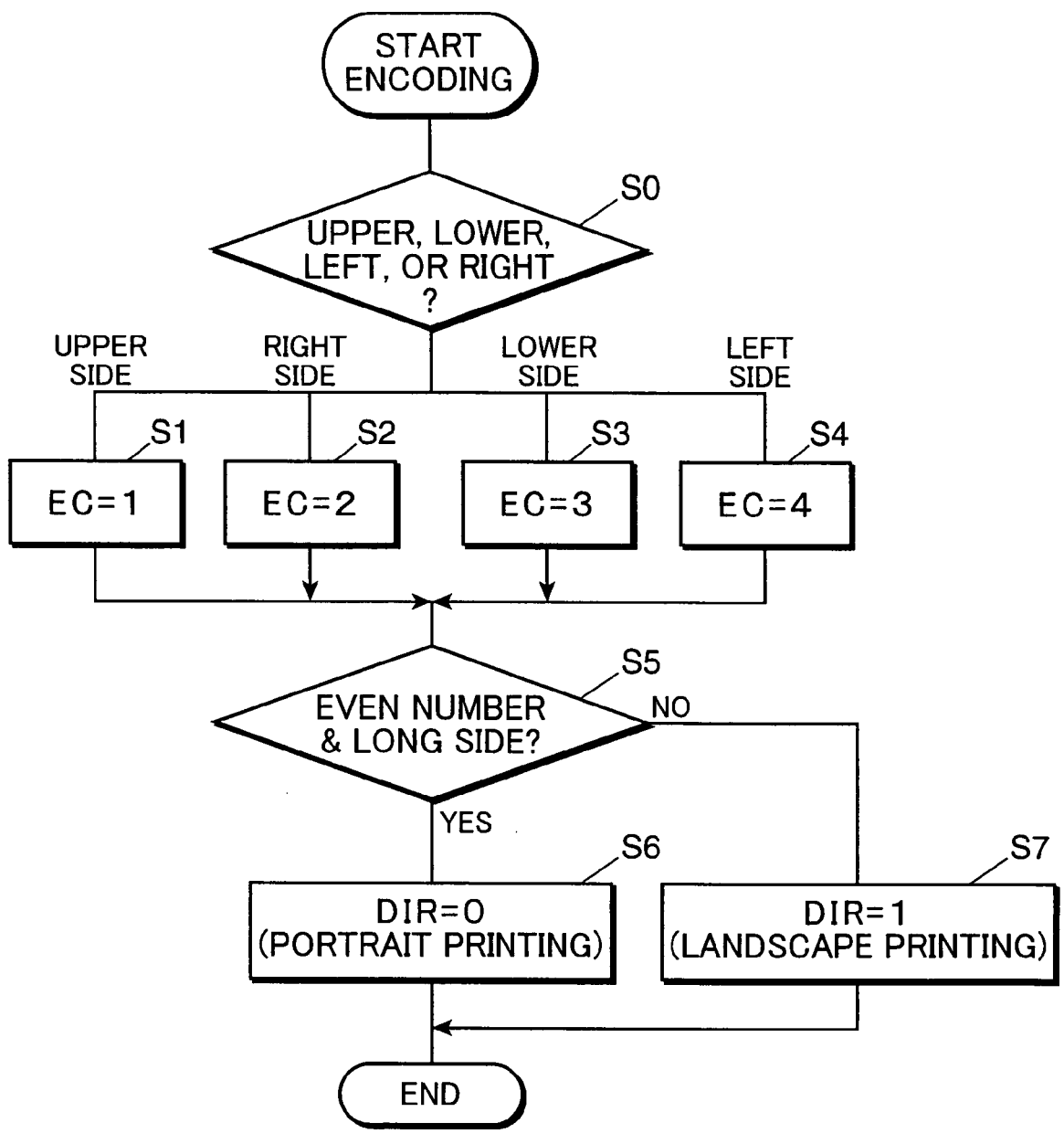

FIG. 12

POST PROCESSING RESTRICTION TABLE

| No | SHEET SIZE | SIDE | POST PROCESSING POSITION |
|---|---|---|---|
| 1 | A3,B4 | L | MIDDLE, TWO HOLES, FOUR HOLES |
| 2 | Letter,B5 | L | TWO HOLES |
| 3 | B5 | L | FOUR HOLES |
| 4 | A4 | S | FOUR HOLES |

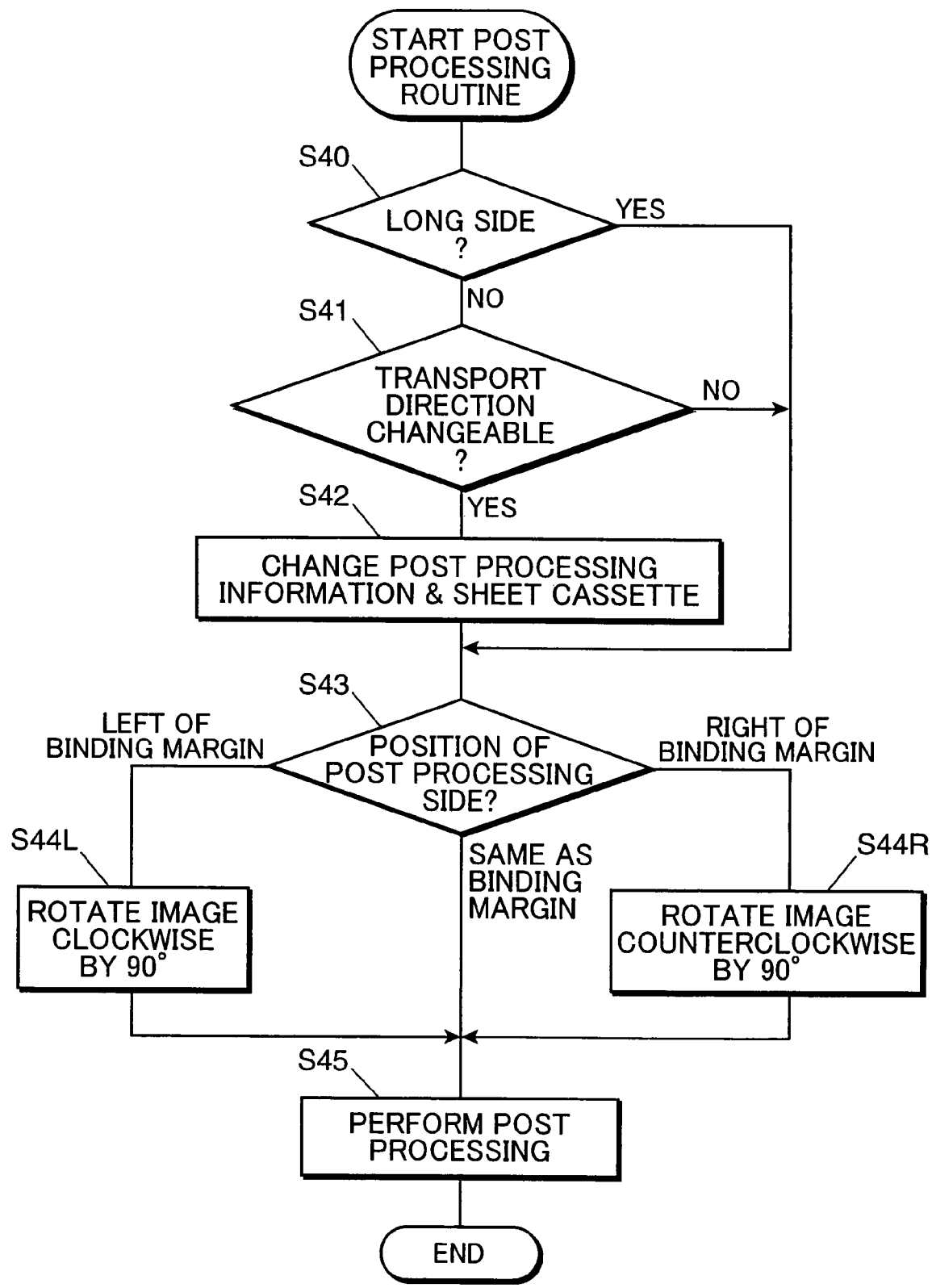

FIG. 15

| SETTING BY USER | CHANGE TO SC=3 WHEN SC=1 | CHANGE TO SC=1 WHEN SC=3 |
|---|---|---|
| EC=1<br>UPPER LEFT / UPPER MIDDLE / UPPER RIGHT<br>(image with BINDING MARGIN 3, TRANSPORT DIRECTION) | EC=4<br>ROTATE IMAGE CLOCKWISE BY 90°<br>(image with POST PROCESSING SIDE 3, BINDING MARGIN, TRANSPORT DIRECTION) | EC=2<br>ROTATE IMAGE COUNTERCLOCKWISE BY 90°<br>(image with POST PROCESSING SIDE 1, BINDING MARGIN, TRANSPORT DIRECTION) |

CHANGE POST PROCESSING SIDE FROM SHORT SIDE TO LONG SIDE (BINDING MARGIN UNCHANGED)

FIG. 16

| SETTING BY USER | ROTATE IMAGE COUNTERCLOCKWISE BY 90° | CHANGE POST PROCESSING SIDE FROM SHORT SIDE TO LONG SIDE (BINDING MARGIN UNCHANGED) | |
|---|---|---|---|
| | | CHANGE TO SC=3 WHEN SC=1 | CHANGE TO SC=1 WHEN SC=3 |
| EC=2 | EC=2 | EC=1 ROTATE IMAGE CLOCKWISE BY 90° | EC=3 ROTATE IMAGE COUNTERCLOCKWISE BY 90° |

FIG. 17

PRINT SETTING

| BASIC | LAYOUT | POST PROCESSING | IMAGING | PRINT | JOB | DETAILS |

☑ POST PROCESSING SIDE — 20
POSITION: [CUSTOMIZED SETTING ▶] — 23 — 29 CUSTOMIZED SETTING / MARGIN BETWEEN LEFT & RIGHT PAGES

☑ STAPLING — 21
POSITION: [UPPER LEFT ▶] — 24
COUNT: ⦿ ALL  ○ PER DESIGNATED NUMBER OF SHEETS

☑ PUNCHING — 22
NUMBER OF HOLES: [TWO HOLES ▶] — 25

☐ SEPARATE
METHOD: [OFFSET JOB ▶]

26 — PCL XL

| ITEM | CONTENTS |
|---|---|
| DISTRIBUTOR | AUTO SELECT |
| DESTINATION | TRAY A |
| PRINT DIRECTION | LONGITUDINAL |
| COPY NUMBER | 1 |
| INTEGRATE | NO |
| POSTER PRINT | NO |
| MAGNIFICATION | 100% |
| DOUBLE SIDED PRINT | NO |
| STAPLING | UPPER LEFT |
| PUNCHING | TWO HOLES |
| SHEET SIZE | A1 |

26B — IMAGE
27B — SETTING VALUE REFERENCE LIST
28 — OK / CANCEL / APPLY

IMAGE FORMING APPARATUS DRIVER, OPERATION SETTING DEVICE FOR IMAGE FORMING APPARATUS, IMAGE FORMING APPARATUS, AND IMAGE FORMING SYSTEM FOR POST-PROCESSING

BACKGROUND OF THE INVENTION

1. Field of the Invention

The present invention relates to an image forming apparatus for transporting a sheet and forming an image on the sheet, such as a printer, a copier, a facsimile machine, or a complex machine, and more particularly to an image forming apparatus driver, to be connected to an image forming apparatus, for performing an operation setting, an operation setting device for use in an image forming apparatus incorporated with the image forming apparatus driver, an image forming apparatus incorporated with the operation setting device, and an image forming system incorporated with the operation setting device.

2. Description of the Related Art

Conventionally, as shown in FIG. 4 of Japanese Unexamined Patent Publication No. 2002-241041 (D1), in an image forming apparatus such as a printer or a copier using sheets of a size capable of longitudinal transport in which a long side direction of the sheet is aligned with a sheet transport direction, and transverse transport in which a short side direction of the sheet is aligned with the sheet transport direction, multiple binding position information for a sheet bundle have been used. Therefore, complex sorting is required to determine whether proper stapling/punching processing is executable, based on a designated printing direction, sheet size, and sheet transport direction. This may make a designation of a post-processing position by a user, or an operation concerning post-processing information to be executed by a program complicated.

In use of a post-processor such as a stapler or a punch, in the case where the long side of a small-sized sheet e.g. A4 size sheet, and the short side of a large-sized sheet e.g. A3 size sheet are equal in length, it is possible to perform post-processing in a state that the short side of the large-sized sheet and the long side of the small-sized sheet having the same length are aligned with each other.

In view of the above, D1 discloses an arrangement that a binding margin is defined at a predetermined position on a sheet in forming image data on a first sheet, and a binding margin is defined in forming image data on a second sheet by aligning the sheet transport directions of the first sheet and the second sheet in such a manner that the lengths of the binding margins of the first sheet and the second sheet are equal to each other. In the case where an image is to be formed on a special sheet where a picture, a format, or the like has already been printed, post-processing may be carried out after an image is formed on the special sheet in an unwanted printing direction, because the printing direction is determined depending on the setting direction of the special sheet with respect to a sheet cassette.

Also, as shown in FIG. 9(c) of Japanese Unexamined Patent Publication No. 2006-209141 (D2), two binding positions in a long side direction and two binding positions in a short side direction are displayed on a post-processing side setting screen of a printer driver so that the user can select one of the binding positions. In this case, since the number of combinations on binding position is small, the user may find it difficult to select an intended binding pattern. Conversely, if all the possible combinations on binding position are listed, e.g. thirty-two binding patterns are displayed, it is not easy for the user to select a proper binding pattern, which may lower the operability. This drawback may also occur in the case where post-processing is performed for a sheet bundle of the same size including a portrait image and a landscape image.

In the specification and claims, "portrait printing" means printing an image on a sheet placed vertically i.e. with the shorter side at the top, and "landscape printing" means printing an image on a sheet placed horizontally i.e. with the longer side at the top, and a portrait image and a landscape image are images printed by the portrait printing and the landscape printing, respectively.

The number of setting items to be designated on a setting screen of a printer driver is increased, as the printer has multi-functions. As a result, the setting screen may be divided into multiple pages e.g. seven pages, and merely a setting screen corresponding to a selected tab page may be displayed on a monitor. If it is necessary to set many items, the user may likely to forget the setting contents of the items. As a result, the user is required to switch the tab pages many times to check the setting contents, which may lower the operability.

Japanese Unexamined Patent Publication No. 2002-287930 (D3) discloses printing a reference list in which all the setting items and the setting contents of the individual setting items are correlated to each other. The reference list is printed in response to a user's request for support by the telephone. In ordinary printing operations, the user may not print/output the setting contents after all the items are set or during the setting operation to check the setting contents.

In use of a stapler, stapling at two middle positions in a long side direction of A3 size sheet is restricted. In using a sheet printed with e.g. a letterhead, whose printing direction is fixed, the setting direction of the sheet with respect to a sheet cassette also serves as a factor in determining whether stapling is allowed or not.

In view of the above, Japanese Unexamined Patent Publication No. 2006-174064 (D4) discloses an arrangement, in which judgment is made as to whether combination of a designated stapling position and a designated setting direction of a sheet with respect to a sheet cassette corresponds to an allowable combination described in judgment information stored in a storage; and if the designated combination does not correspond to the allowable combination, an image forming operation is restricted by locking an operation of a printing section, and a message "CHANGE THE SETTING DIRECTION OF SHEET" is displayed on an LCD of an operating section. In this arrangement, judgment as to whether stapling at the designated stapling position is restricted is made only after the stapling position is designated, which is not desirable in the aspect of operation. On the other hand, if a judgment result as to whether stapling is allowed is displayed with respect to all the possible stapling positions before the stapling position is selected, too many alternatives are displayed, which is also not desirable in the aspect of operation. A similar drawback as mentioned above may occur in performing a punching processing.

SUMMARY OF THE INVENTION

In view of the above problems residing in the prior art, it is an object of the invention to provide an image forming apparatus that enables to facilitate post-processing setting for a sheet bundle in the case where a sheet of a size capable of longitudinal transport and transverse transport is used.

An image forming apparatus according to an aspect of the invention includes: an image former for forming an image on a sheet based on image data; a post-processor for performing post-processing with respect to the sheet having the image formed by the image former; a post-processing designator for designating a post-processing side of a sheet bundle, and a post-processing position with respect to the post-processing side, as post-processing information; a storage for storing the image data to be supplied to the image former, and the post-processing information designated by the post-processing designator; an image rotator for changing an orientation of the image data stored in the storage in such a manner that a lead end or a tail end of the sheet bundle in a sheet transport direction serves as the post-processing side; and a controller for causing the post-processor to perform the post-processing based on the post-processing information stored in the storage, wherein the post-processing designator identifies four sides of the sheet based on combination information relating to combination of discrimination as to whether the post-processing side is a long side or a short side of the sheet, and discrimination as to whether the post-processing side is a left side, a right side, an upper side, or a lower side of the sheet, depending on whether the image to be formed on the sheet is a portrait image or a landscape image, and designates the post-processing side by using the combination information.

In the image forming apparatus having the above arrangement, the post-processing side of the sheet bundle is designated based on the combination information, depending on whether the image is the portrait image or the landscape image. This enables to simplify the post-processing information, thereby enabling to simplify a post-processing routine.

These and other objects, features and advantages of the present invention will become more apparent upon reading the following detailed description along with the accompanying drawing.

BRIEF DESCRIPTION OF THE DRAWINGS

FIG. 1 is a block diagram showing a schematic arrangement of an image forming system to which an image forming apparatus as a first embodiment of the invention is applied.

FIG. 2 is a block diagram showing a schematic arrangement of a hardware configuration of a system controller.

FIG. 4 is a chart showing a structure of a post-processing setting code.

FIG. 5 is a diagram showing the contents of a post-processing information setting screen.

FIG. 7 is a chart showing post-processing positions and identification codes thereof on four post-processing sides of a sheet, as well as image states and rotation angles showing that images are rotated in such a direction that a lead end of the sheet in a sheet transport direction serves as a post-processing side, in the case where post-processing is performed for portrait printing.

FIG. 8 is a diagram showing post-processing positions and identification codes thereof on four post-processing sides of a sheet, as well as image states and rotation angles showing that images are rotated in such a direction that a lead end of the sheet in a sheet transport direction serves as a post-processing side, in the case where post-processing is performed for landscape printing.

FIG. 9 is a flowchart showing steps for converting a post-processing side identification character string into a post-processing side identification code and a printing direction identification code.

FIG. 12 is a chart showing the contents of a post-processing restriction table.

FIG. 14 is a flowchart showing steps on a post-processing operation to be executed by a post-processing controller.

FIG. 15 is a chart for describing an arrangement of using a left-side margin of a sheet as a post-processing side in binding sheets having a portrait image.

FIG. 16 is a chart for describing an arrangement of using a left-side margin of a sheet as a post-processing side in binding sheets having a landscape image.

FIG. 17 is a diagram showing the contents of a post-processing information setting screen.

DETAILED DESCRIPTION OF THE PREFERRED EMBODIMENTS

Figure 3A:
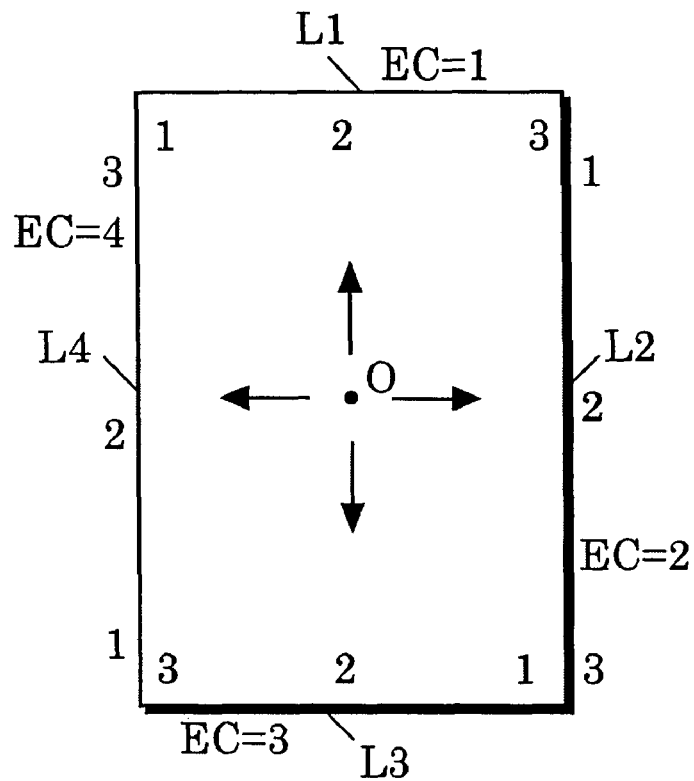
FIG. 3A is a diagram for describing sides L1, L2, L3, and L4, post-processing side identification codes EC1, EC2, EC3, and EC4, and stapling positions ST1, ST2, and ST3 of a sheet bundle.

In the following, embodiments of the invention are described referring to the drawings. It should be noted that identical or equivalent elements throughout the drawings are denoted with the same reference numerals, and repeated description on the elements identical or equivalent to each other may be omitted.

First Embodiment

FIG. 1 is a block diagram showing a schematic arrangement of an image forming system to which an image forming apparatus as a first embodiment of the invention is applied.

The image forming system includes an image forming apparatus 10 e.g. a complex machine, and a host computer HC which is connected to the image forming apparatus 10 and has an interactive input device, such as a keyboard or a pointing device. To simplify the description, an arrangement that a printer is used as the image forming apparatus 10 is described. In this arrangement, the image forming apparatus 10 is adapted to form an image on a sheet, based on image information to be supplied from the host computer HC, and information set in the image forming apparatus 10.

The image forming apparatus 10 has a system controller 11. An image information memory 12, a setting information memory 13, an operation panel 14, an image writing controller 15, a sheet transport controller 16, and a post-processing controller 17 are connected to the system controller 11.

The system controller 11 is operative to temporarily store printing data to be supplied from the host computer HC into the image information memory 12. The printing data is supplied from a printing routine of an application program to the system controller 11 via API (Application Program Interface) of OS (Operating System), and a printer driver 18 as a low level layer of the operating system. The printing data is described in PDL (Page Description Language). The system controller 11 is operative to store, into the setting information memory 13, setting information which has been designated by the user on the operation panel 14, or setting information included in the printing data. The setting information memory 13 is a rewritable nonvolatile memory e.g. a flash memory.

The system controller 11 updates the contents stored in the image information memory 12 based on the contents stored in the setting information memory 13 according to needs, and supplies the updated image information to the image writing controller 15. Upon receiving the image information, the image writing controller 15 expands the image information into bitmap data, attaches a synchronizing signal to the bitmap data to generate a video signal, and on-off controls a laser beam by the video signal, whereby an intended electrostatic latent image is formed on the surface of a photosensitive drum provided in an image writer 15M. The image writer 15M develops the electrostatic latent image into a toner image by attracting toner onto a charger provided around the photosensitive drum. Thereafter, the toner image is transferred onto a sheet for image fixation.

The system controller 11 controls the sheet transport controller 16 to drive a sheet transporter 16M so that a sheet is transported from a sheet cassette to the image writer 15M. Then, the image writer 15M is operative to form an image on the sheet, and the sheet carrying the image is discharged onto a discharge tray. For image formation on the other side of the sheet in double-sided printing, the sheet after the image formation on one side thereof is switched back without discharge of the sheet, and is transported to the image writer 15M again. After an image is formed on the other side of the sheet by the image writer 15M, the sheet is discharged onto the discharge tray.

The system controller 11 controls the post-processing controller 17 to activate a stapler 17MS or a punch 17MP, based on post-processing information stored in the setting information memory 13 so that a stapling processing or a punching processing is performed for a sheet bundle after the image formation. The punching processing may be performed for each of the sheets.

FIG. 2 is a block diagram showing a schematic arrangement of a hardware configuration of the system controller 11 shown in FIG. 1.

The system controller 11 has an MPU (Micro Processing Unit) 111. An EEPROM (Electrically Erasable and Programmable Read Only Memory) 113E1, an EEPROM 113E2, a DRAM (Dynamic Random Access Memory) 113D, an HDD (Hard Disk Drive) 114, a scanner 116, an NIC (Network Interface Card) 117, and a facsimile modem 118 are connected to the MPU 111 via an interface (I/F) 112. In FIG. 2, multiple interfaces are indicated by a single block to simplify the description. The interface 112 is connected to the image information memory 12, the setting information memory 13, the operation panel 14, the image writing controller 15, the sheet transport controller 16, and the post-processing controller 17 shown in FIG. 1.

The EEPROM 113E1 and the EEPROM 113E2 are e.g. a flash memory. BIOS (Basic Input/Output System) is stored in the EEPROM 113E1. The EEPROM 113E2 stores therein an operating system, a service program and an application program, as high level layers of the operating system, and a device driver as a low level layer of the operating system. The DRAM 113D is used as a work area, and the HDD 114 is used for data storage.

The scanner 116 is used for inputting an image in copying or facsimile transmission. The NIC 117 is connected to the host computer HC via a cable or a wireless communication medium for a print job or a like operation. The facsimile modem 118 is used for facsimile transmission/receiving.

Figure 3B:
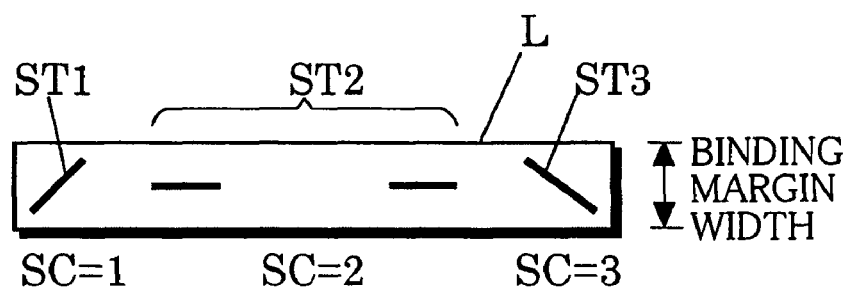
FIG. 3B is a diagram for describing stapling positions ST1, ST2, and ST3, and stapling position identification codes SC1, SC2, and SC3 on a post-processing side L.
Figure 3C:
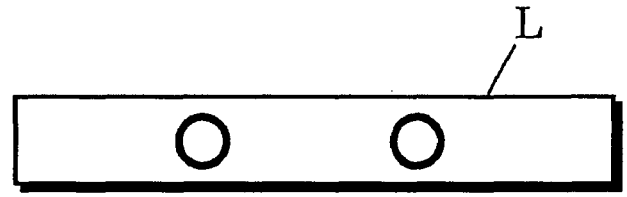
FIG. 3C is a diagram for describing punch codes PC0 and PC1 on a post-processing side L.

In the following, a post-processing setting code to be stored in the setting information memory 113 is described. FIGS. 3A through 3C are diagrams for describing the post-processing setting code. FIG. 3A shows a case that the printing direction is aligned with a long side direction, in other words, a portrait image is printed. The value of a printing direction identification code DIR is set to "0" or "1" depending on portrait printing or landscape printing. The user designates one side L of four sides L1, L2, L3, and L4 of a sheet bundle for which a stapling processing or a punching processing is to be performed, as a post-processing side. If the side L1, L2, L3, or L4 is designated as the post-processing side, the value of a post-processing side identification code EC is set to "1", "2", "3", or "4", respectively.

As will be described later, the post-processing side does not necessarily correspond to a binding margin for determining a page opening direction. In a stage when the user designates a post-processing side, the post-processing side corresponds to the binding margin. Therefore, the user may designate the binding margin as the post-processing side in designating the post-processing side.

As regards the stapling position, the user may designate a certain position on the post-processing side L, viewed from the center O of a sheet bundle, as the stapling position. As shown in FIG. 3B, the stapling position on the post-processing side L is either one of ST1, ST2, and ST3, which correspond to a left end position, two middle positions, and a right end position, viewed from the center O of a sheet bundle, respectively. The staple at the stapling position ST1 and the staple at the stapling position ST3 are oblique staples at the end portions i.e. corner portions of the post-processing side L, respectively. The staple at the stapling position ST2 has a two-point stapling pattern at the middle portion of the post-processing side L. The stapling positions ST1, ST2, and ST3 are represented by stapling position identification codes SC=1, 2, and 3, respectively.

Information relating to a punching processing in a simplest form is information indicating whether a punching processing is performed along the post-processing side L. FIG. 3C shows a case that a punching processing is performed along the post-processing side L. Punch codes PC=0 and 1 indicate that a punching processing is not performed and a punching processing is performed, respectively. If a punching processing is performed, the user may designate the number of punch holes (generally, two to four holes) by the punch 17MP.

With use of the aforementioned combination on the post-processing side identification code EC, and the stapling position identification code SC and the punch code PC which are provided independently of the post-processing side, post-processing information can be simplified, thereby enabling to simplify a post-processing routine.

FIG. 4 is a chart showing a structure of the post-processing setting code to be stored in the setting information memory 13. The post-processing setting code is set on the operation panel 14, or on a screen to be displayed in response to activation of the printer driver 18. The post-processing setting code includes: the printing direction identification code DIR=0, 1; the post-processing side identification code (post-processing side ID) EC=0, 1, 2, 3, 4; the stapling position identification code (stapling position ID) SC=0, 1, 2, 3; the punch code PC=0, 1; a binding margin width (unit: mm); and a sheet size. EC=0, SC=0, and PC=0 indicate conditions that a post-processing is not performed, a stapling processing is not performed, and a punching processing is not performed, respectively. The post-processing is performed at the middle position of the binding margin width.

The length of the post-processing side is determined based on the sheet size, the printing direction identification code DIR, and the post-processing side identification code EC. Data relating to the stapling positions ST1 through ST3 in long side direction on the post-processing side depending on the length of the post-processing side is stored in the EEPROM 113E2. The post-processing side identification code EC designated by the user is duplicated as a binding margin code (binding margin ID) before the post-processing side identification code is automatically updated for storage, which will be described later.

FIG. 5 shows an example of a post-processing information setting screen. The screen is displayed in response to a user's selecting a post-processing tab page after the printer driver 18 is activated. Checkboxes 20, 21, and 22 are provided to enable commands represented by character strings displayed in corresponding right-side combo boxes 23, 24, and 25, respectively.

Figure 6A:
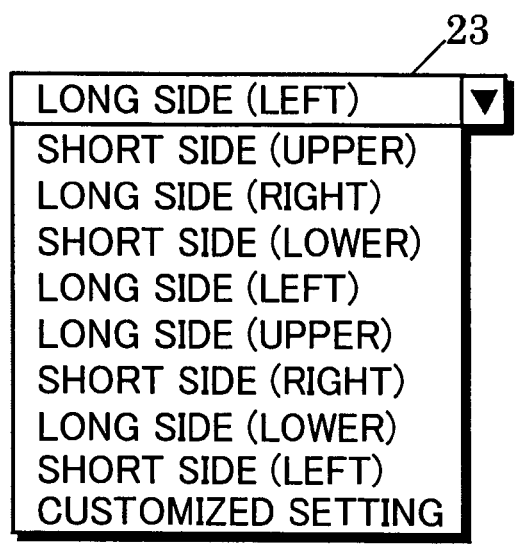
FIG. 6A is a diagram showing a dropdown list of post-processing side identification character strings.

First, description is made as to how a post-processing side is set. When the user clicks an arrow button at a right portion of the combo box 23 with a mouse, as shown in FIG. 6A, a list of post-processing side identification character strings is displayed as a dropdown list. The dropdown list includes character strings for identifying four post-processing sides to be used in portrait printing and four post-processing sides to be used in landscape printing. Specifically, the four post-processing sides to be used in portrait printing are "short side (upper)", "long side (right)", "short side (lower)", and "long side (left)", which correspond to the post-processing side identification codes EC=1, 2, 3, and 4, respectively, as shown in FIG. 7. The four post-processing sides to be used in landscape printing are "long side (upper)", "short side (right)", "long side (lower)", and "short side (left)", which correspond to the post-processing side identification codes EC=1, 2, 3, and 4, respectively, as shown in FIG. 8. Since the post-processing side identification character string is expressed by combination of the phrase "long side" or "short side", and the word "upper", "lower", "left", or "right", the user can easily select one of the eight post-processing sides to be used in portrait printing and landscape printing. "CUSTOMIZED SETTING" in the dropdown list shown in FIG. 6A will be described in a below-mentioned second embodiment.

When the user clicks one of the rows in the dropdown list shown in FIG. 6A with the mouse, the designated character string is displayed in a text box of the combo box 23. Then, an operation shown in FIG. 9 is started. FIG. 9 is a flowchart showing steps for converting the character string list shown in FIG. 6A into the printing direction identification code DIR and the post-processing side identification code EC.

Referring to FIG. 9, if the character string clicked by the user includes the word "upper", "lower", "left", or "right" (Step S0), the routine proceeds to a corresponding Step S1, S2, S3, or S4, where the value "1", "2", "3", or "4" is substituted in the post-processing side identification code EC.

If the clicked character string includes the phrase "long side", and the value of the post-processing side identification code EC is an even number (YES in Step S5), the value "0" is substituted in the printing direction identification code DIR, which represents that a portrait image is printed. If, on the other hand, the clicked character string does not include the phrase "long side", and the value of the post-processing side identification code EC is not an even number (NO in Step S5), the value "1" is substituted in the printing direction identification code DIR, which represents that a landscape image is printed.

As described above, the post-processing side identification character string is easily encoded into the printing direction identification code DIR and the post-processing side identification code EC.

Referring back to FIG. 5, each time an image display button 26B is clicked, a post-processing image window 26 is switched over between display and non-display. Information relating to the selected post-processing is visually and superimposedly displayed on an image to be formed on a sheet in the post-processing image window 26. In FIG. 5, since all the checkboxes 20 through 22 are checkmarked, all the information displayed in the combo boxes 23 through 25 are visually displayed in the post-processing image window 26. Thereby, the user can easily recognize the post-processing side selected in the combo box 23.

In the following, description is made as to how a stapling processing is set. When the user clicks an arrow button at a right portion of the combo box 24 with the mouse, a list of three selectable stapling position identification character strings is displayed as a dropdown list, depending on the post-processing side selected in the combo box 23. FIGS. 6B through 6E show dropdown lists in the case where the selected post-processing side identification code EC=1, 2, 3, and 4, respectively. The dropdown lists are displayed independently of the printing direction identification code DIR.

The columns "SETTING BY USER" in FIGS. 7 and 8 each shows stapling position identification character strings to be displayed in accordance with the value of the post-processing side identification code EC, and the values of the stapling position identification code SC corresponding to each of the stapling position identification character strings. Since the four corner positions on a sheet are expressed by combination of the word "left" or "right", and the word "upper" or "lower", the user can easily and securely select the stapling position.

Figure 6B:
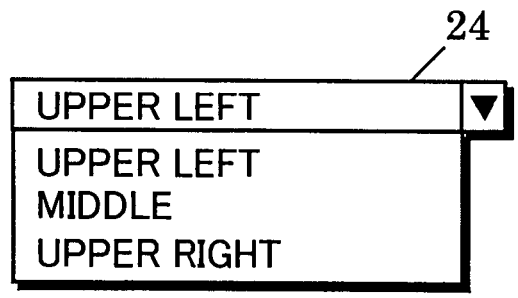
FIG. 6B is a diagram showing a dropdown list of stapling position identification character strings, specifically, the post-processing side identification code EC=1.
Figure 6C:
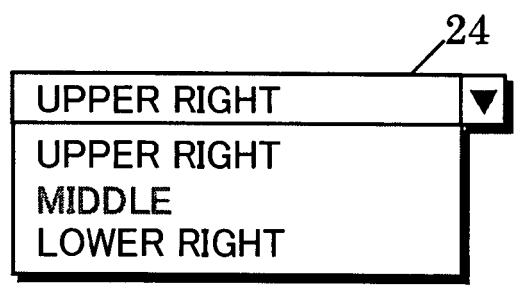
FIG. 6C is a diagram showing a dropdown list of stapling position identification character strings, specifically, the post-processing side identification code EC=2.
Figure 6D:
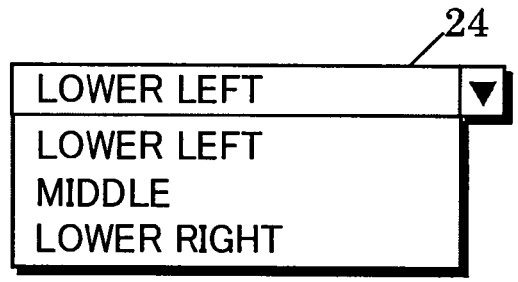
FIG. 6D is a diagram showing a dropdown list of stapling position identification character strings, specifically, the post-processing side identification code EC=3.
Figure 6E:
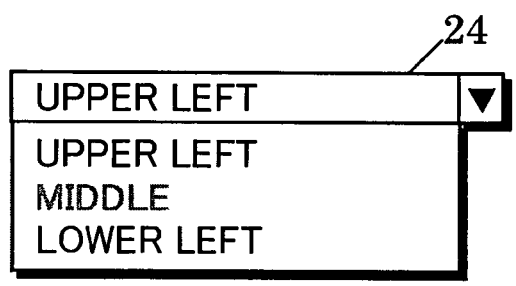
FIG. 6E is a diagram showing a dropdown list of stapling position identification character strings, specifically, the post-processing side identification code EC=4.
Figure 10:
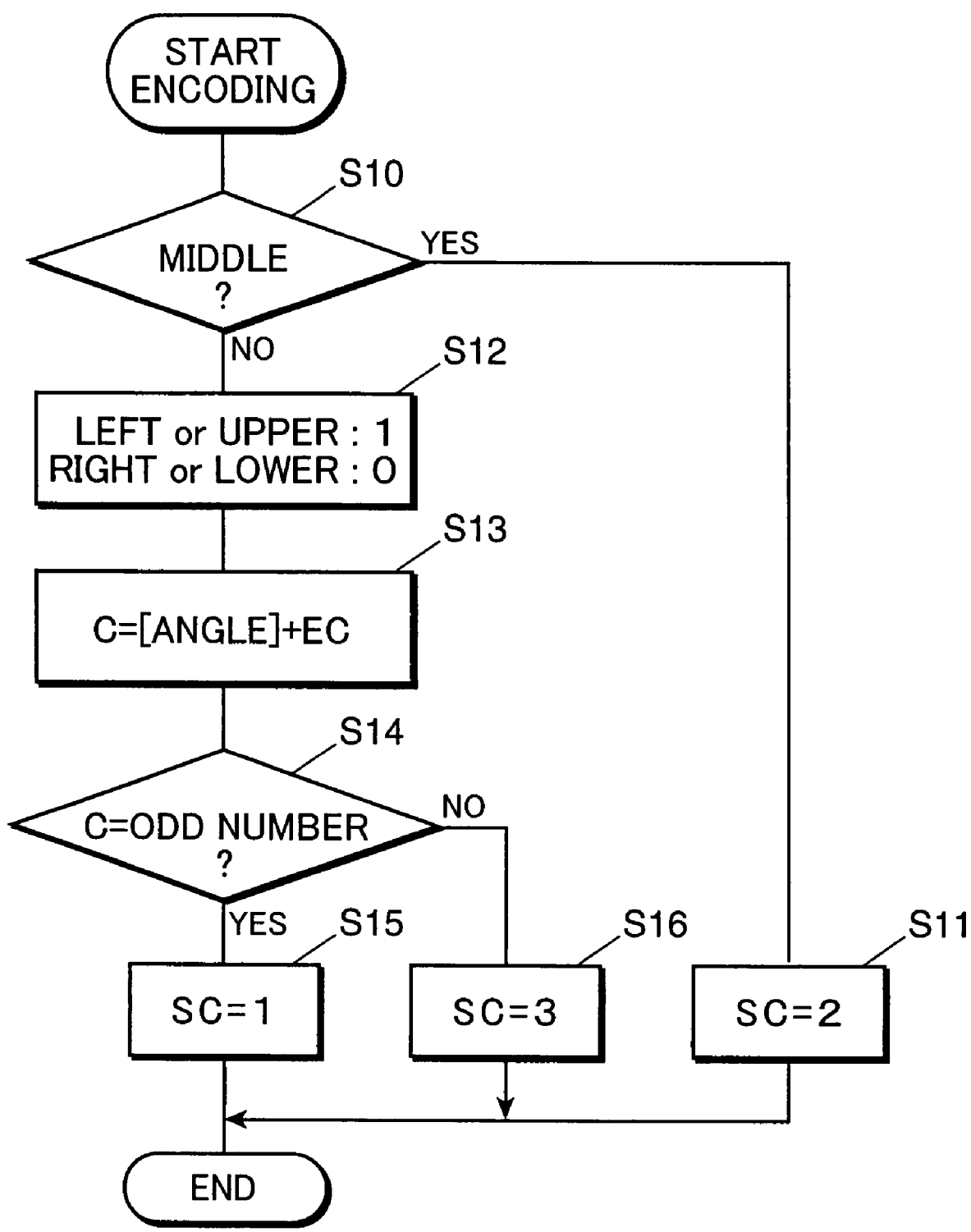
FIG. 10 is a flowchart showing steps for converting a stapling position identification character string into a stapling position identification code.

For instance, when the user clicks one of the rows in the dropdown list shown in FIG. 6B with the mouse, the designated character string is displayed in a text box of the combo box 24. Then, an operation shown in FIG. 10 is started. FIG. 10 is a flowchart showing steps for converting the character string list shown in FIG. 6B into the stapling position identification code SC. This embodiment is described by using the dropdown list shown in FIG. 6B. It is needless to say that a similar operation as mentioned above is performed in any case where the dropdown lists shown in FIGS. 6C through 6E are displayed.

Referring to FIG. 10, first, if the word "middle" is included in the character string clicked by the user (YES in Step S10), the routine proceeds to Step S11, where the value "2" is substituted in the stapling position identification code SC2 (Step S11), and the routine is ended.

If, on the other hand, the word "middle" is not included in the character string clicked by the user (NO in Step S10), the value "1" is correlated to both of the words "left" and "upper" included in the clicked character string, and the value "0" is correlated to both of the words "right" and "lower", and the sum of the two values corresponding to one character string is obtained (Step S12). For instance, if the combination of the word "left" and the word "upper" is expressed by a character string [upper left], the character string [upper left]=1+1=2. Likewise, the character string [upper right]=0+1=1, the character string [lower left]=1+0=1, and the character string [lower right]=0+0=0. The summation values are generally expressed as [angle].

Then, the [angle] obtained in Step S12 is added to the printing direction identification code DIR, in other words, the computation: C=[angle]+EC is performed (Step S13).

If the value of C obtained in Step S13 is an odd number (YES in Step S14), the value "1" is substituted in the stapling position identification code SC. If, on the other hand, the value of C is an even number (NO in Step S14), the value "3" is substituted in the stapling position identification code SC.

By performing the above operations, the stapling position identification character string is easily encoded into the stapling position identification code SC.

In the following, description is made as to how a punching processing is performed. Referring back to FIG. 5, when the user clicks an arrow button at a right portion of the comb box 25, a list showing the numbers of punch holes to be formed in the post-processing side selected in the comb box 23 is displayed as a dropdown list. The number of punch holes to be formed in the post-processing side is determined by the punch 17MP. When the user clicks one of the rows in the dropdown list with the mouse, the selected character string is displayed in a text box of the comb box 25. Subsequently, the selected character string is encoded into a corresponding identification code.

In the above operation, there is a case that a stapling processing or a punching process is restricted, depending on the combination of the sheet size selected on a basic tab screen (not shown), and the post-processing side selected in the combo box 23. In the case where a stapling processing or a punching processing is restricted, the corresponding character string in the dropdown list to be displayed in response to click of the arrow button in the combo box 24 or 25 is displayed in a gray-out manner so that the user is restricted from selecting the character string, in other words, selection of the character string is disabled.

Figure 11:
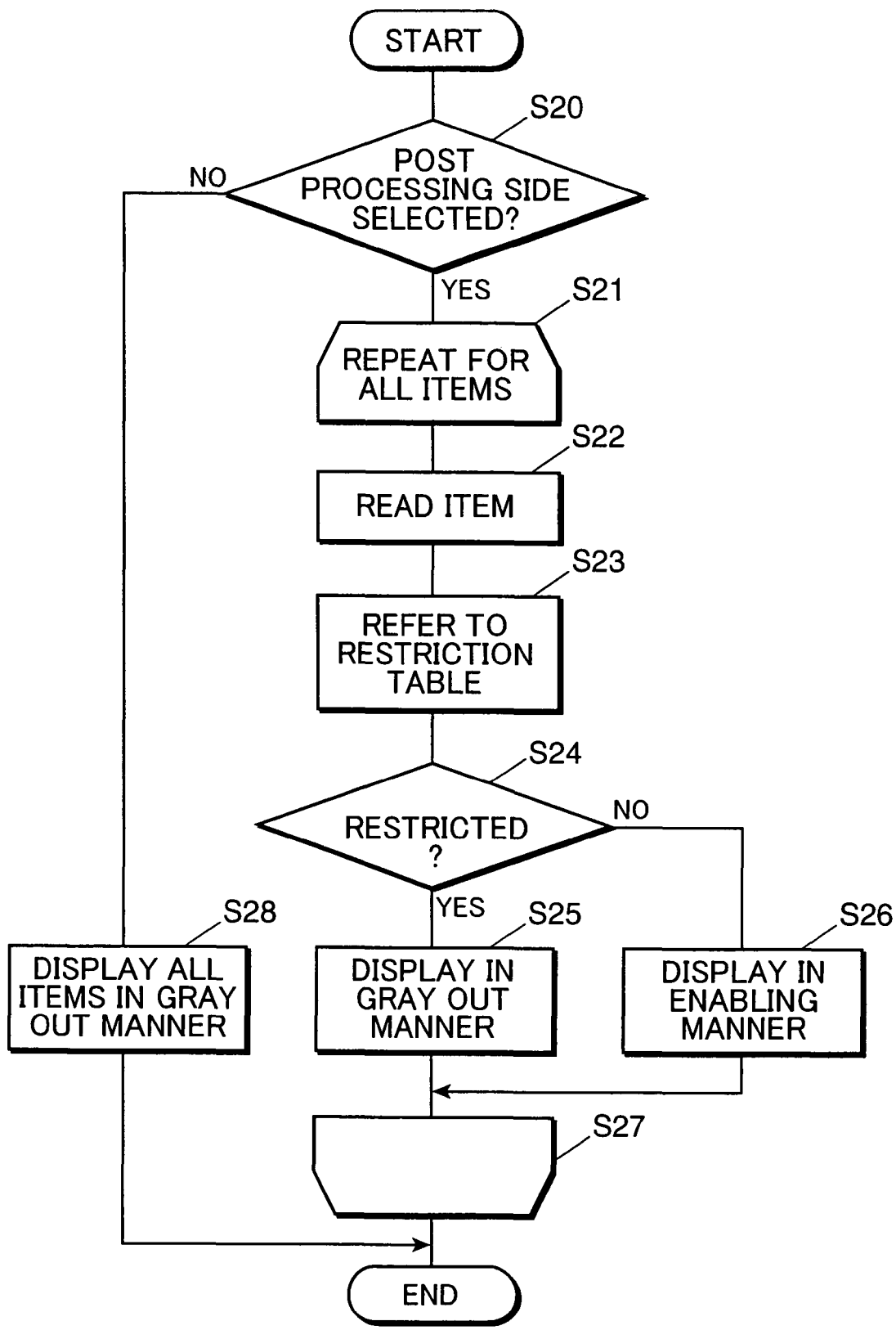
FIG. 11 is a flowchart showing steps for displaying a list of stapling position identification character strings, and a list of the number of punch holes in a gray-out manner.

FIG. 11 is a flowchart showing steps on gray-out display to be initiated in response to click of the arrow button in the combo box 24 or 25.

In FIG. 11, if the checkbox 20 is marked, and a post-processing side is selected in the combo box 23, in other words, customized setting is not designated (YES in Step S20), the routine repeatedly executes the loop from Step S21 to Step S27 with respect to all the items in the dropdown list of the combo box 24. The items for which the loop from Step S21 to Step S27 is repeatedly executed are determined depending on the post-processing side selected in the combo box 23.

Specifically, when the routine enters the loop, one of all the items is read (Step S22), and a post-processing restriction table shown in FIG. 12 is referred to (Step S23).

Then, judgment is made as to whether the combination of the item read in Step S22, information as to whether the selected post-processing side is a long side (L) or a short side (S), and the sheet size selected in the basic tab page is described in the post-processing restriction table (Step S24). For instance, referring to FIG. 12, in the case where a stapling processing is attempted to be performed at the middle portion on a long side margin of A3 size sheet, the judgment result is affirmative, because the combination corresponds to the first row in the post-processing restriction table. If the judgment result is affirmative (YES in Step S24), the item read in Step S22 is displayed in the dropdown list of the combo box 24 in a gray-out manner (Step S25), and the routine returns to Step S22.

If, on the other hand, the judgment result is negative (NO in Step S24), the item read in Step S22 is displayed in the dropdown list of the combo box 24 in an enabling manner (Step S26). If the above operation has not been completed for all the items, the loop returns to Step S22. If, on the other hand, the above operation has been completed for all the items, the control exits the loop, and the routine is ended.

In Step S20, if the checkbox 20 is not marked, or a post-processing side is not selected in the combo box 23 (NO in Step S20), all the items in the dropdown list are displayed in a gray-out manner (Step S28), and the routine is ended.

By performing the above operations, the user can view the selectable post-processing positions before a post-processing position is selected. This enables the user to easily select the post-processing position.

Figure 13:
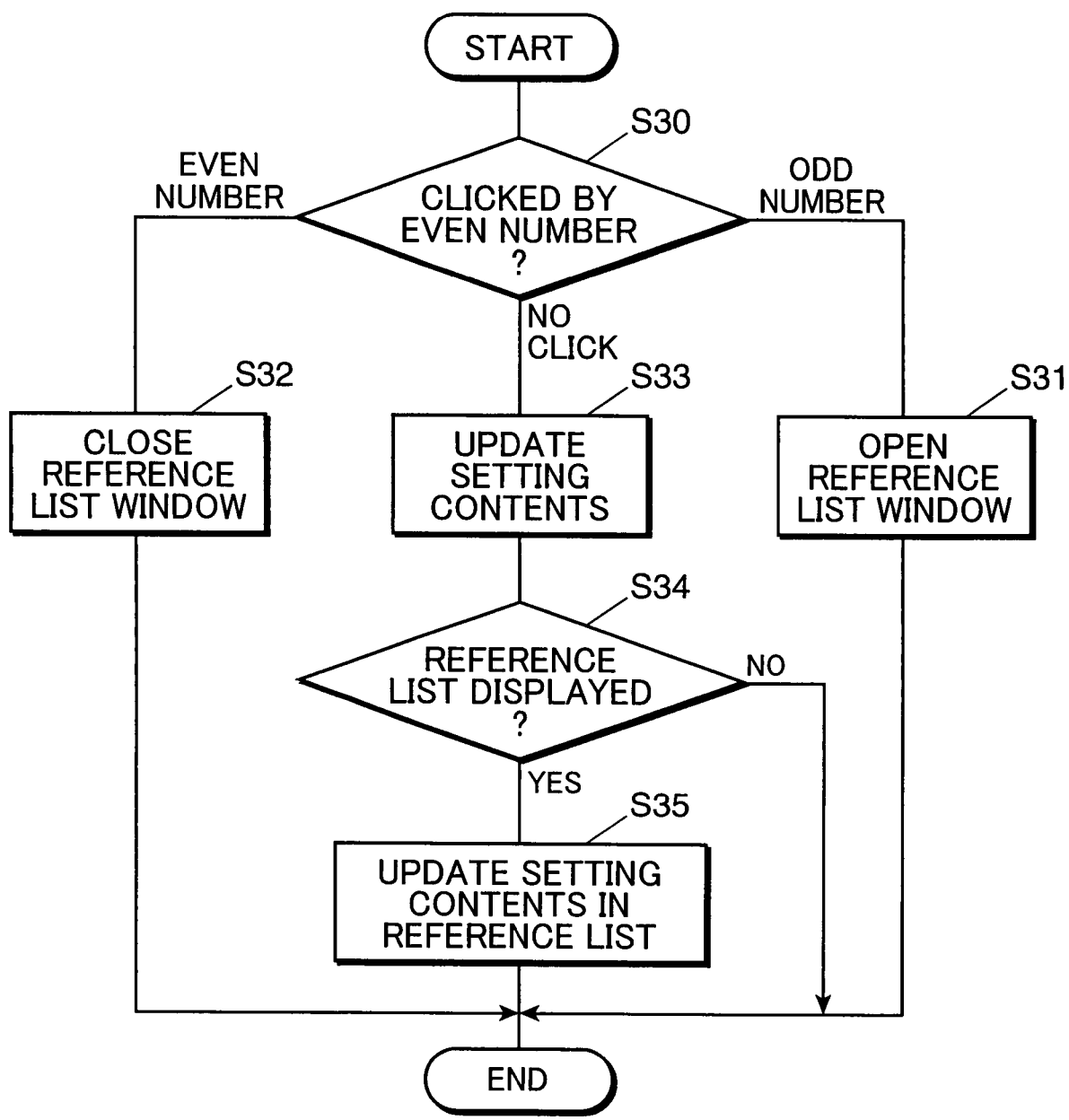
FIG. 13 is a flowchart showing steps for changing a display status of a setting contents reference list window.

In the following, a setting contents reference list window 27 to be displayed on the post-processing information setting screen shown in FIG. 5 is described. FIG. 13 is a flowchart showing steps for changing a display status of the setting contents reference list window 27, which is initiated in response to click of a setting value reference list display button 27B, or an event of changing the setting contents through user's manipulation. On the setting contents reference list window 27 shown in FIG. 5, there are displayed setting items i.e. "SHEET DISTRIBUTOR" (SHEET CASSETTE), "SHEET DESTINATION", "SHEET SIZE", "PRINT DIRECTION", and "COPY NUMBER", which are set on the basic tab page; "INTEGRATION" (e.g. four pages are printed in one sheet), "POSTER PRINT", "MAGNIFICATION", and "DOUBLE-SIDED PRINT", which are set on a layout tab page; and "STAPLING" and "PUNCHING", which are set on a post-processing tab page, as well as setting contents corresponding to the individual setting items. When the user manipulates a scrawl bar, other items which are not shown in FIG. 5 are displayed. The setting contents reference list window 27 is smaller than the right-side setting window in size. Specifically, the size of the setting contents reference list window 27 is substantially one-fourth of the size of the right-side setting window. Thanks to the small-sized setting contents reference list window 27, a vertically extending scrawl bar is provided at the right side of the reference list, and a horizontally extending scrawl bar is provided at the lower side of the reference list, respectively.

Referring to FIG. 13, in response to click of the setting value reference list display button 27B on the post-processing information setting screen shown in FIG. 5, if the number of times of clicking operations is an odd number ("ODD NUMBER" in Step S30), the setting contents reference list window 27 is opened (Step S31), and the routine is ended. Primary contents designated in each of the tab pages are displayed as a list in the setting contents reference list window 27. The initial setting contents to be displayed on the post-processing information setting screen are predefined contents or previously-set contents. If the number of times of clicking operations is an even number (EVEN NUMBER in Step S30), the setting contents reference list window 27 is closed, and the routine is ended.

If it is judged that no clicking operation is performed in Step S30 ("NO CLICK" in Step S30), in other words, if it is judged that a setting contents changing operation is performed through user's manipulation such as click on an item in the dropdown list, a checkbox, or a radio button (not shown) in one of the tab pages on the post-processing information setting screen shown in FIG. 5, the setting contents corresponding to the designated setting item are updated in response to the setting contents changing operation (Step S33).

If the setting contents reference list window 27 is in an opened state (YES in Step S34), and there exists the setting item designated by the user in the setting contents reference list window 27, the setting contents corresponding to the designated setting item are updated (Step S35), and the routine is ended. If, on the other hand, the setting contents reference list window 27 is in a closed state (NO in Step S34), the routine is ended without updating.

By performing the above operations, each time the setting value reference list display button 27B is clicked, the setting contents reference list window 27 is switched over between display and non-display.

As shown in FIG. 5, even if there are as many as seven tab pages in the post-processing information setting screen, the user can easily grasp substantially all the setting contents by looking at the reference list showing a post-processing result, and can recognize an item, which is displayed in gray-out manner, and whose setting is restricted in relation to the other setting contents. This enables to suppress the number of times of switching over the tab pages for checking whether a targeted item has been set, thereby enabling to enhance the operation of the user.

In the following, an operation to be executed by the post-processing controller 17 is described. Referring back to FIG. 5, when the user clicks an OK button 28, setting information in the printer driver 18, and image information to be supplied from the application program via the application program interface of the operating system are transmitted to the system controller 11 by the printer driver 18. Then, the setting information and the image information are stored into the setting information memory 13 and the image information memory 12, respectively. The post-processing controller 17 is operable to perform post-processing merely on a lead end or a tail end of a sheet in the sheet transport direction. In this embodiment, description is made on an arrangement that post-processing is executable merely on a lead end of a sheet in the sheet transport direction.

As described above, the user is allowed to flexibly select a post-processing side except for a case that post-processing is restricted in view of the sheet size or a like factor. Under the circumstances, as shown in the right-side columns in FIGS. 7 and 8, the user is required to rotate an image in such a direction that the lead end of the sheet in the sheet transport direction serves as a post-processing side. Since the value of the stapling position identification code SC is defined independently of image rotation, the order of values of the stapling position identification code SC on the post-processing side is the same among all the images at the different angular positions. Specifically, the stapling position identification code SC at the left end and the stapling position identification code SC at the right end on the lead end of the sheet in the sheet transport direction, viewed from the center of the sheet, are set to "1" and "3", respectively, and the value of the stapling position identification code SC at the two middle positions is set to "2". With this arrangement, the post-processing controller 17 is allowed to perform post-processing based on the post-processing setting code shown in FIG. 4.

FIGS. 7 and 8 show examples in which transverse transport is not restricted, although transverse transport of a sheet may be restricted in a state that an image is rotated by 90 degrees, as shown by e.g. the right-side image corresponding to EC=2 in FIG. 7, depending on the sheet size. Generally, post-processing setting can be performed by the image forming apparatus 10, as well as the post-processing controller 17. This idea is also applied to this embodiment. In other words, the post-processing information setting screen as shown in FIG. 5 can also be displayed on the operation panel 14, and the information displayed on the operation panel 14 can be used in copying.

FIG. 14 is a flowchart showing steps on a post-processing operation to be executed by the post-processing controller 17. FIG. 14 shows an operation of performing post-processing with respect to one page of a sheet bundle in a print job for which the post-processing is designated, after the image forming apparatus 10 receives data relating to one-sided printing from the host computer HC, and the received data is divided and stored into the image information memory 12 and the setting information memory 13. This example describes how the printing efficiency is enhanced by performing transverse transport of aligning the sheet transport direction with the short side direction, if longitudinal transport of aligning the sheet transport direction with the long side direction is changeable to transverse transport.

Referring to FIG. 14, if it is judged that the post-processing side is a long side, in other words, the value of summation: printing direction identification code DIR+EC is an even number, based on the contents stored in the setting information memory 13 (YES in Step S40), the routine proceeds to Step S43. If it is judged that the post-processing side is not a long side (NO in Step S40), the routine proceeds to Step S41.

In Step S41, if the sheet size capable both of longitudinal transport and transverse transport is designated by the image forming apparatus 10, concerning the page for image information; the post-processing information indicates that a punching processing is not performed i.e. PC=0; the stapling position identification code SC=1 or 3; and sheets capable of transverse transport are stored in the sheet cassette, it is judged that the sheet transport direction is changeable (YES in Step S41). Then, the routine goes to Step S42. If, on the other hand, the aforementioned judgment result is negative (NO in Step S41), the routines goes to Step S43.

In Step S42, the contents of the post-processing setting code shown in FIG. 4 is updated in such a manner that the sheet transport direction is aligned with transverse transport, and the previously-designated sheet distributor i.e. the sheet cassette is changed to a sheet cassette accommodating sheets whose size is the same as the sheets accommodated in the previously-designated sheet cassette, and whose transverse transport is executable. The updating is carried out as follows. For instance, in the case where a targeted image is a portrait image as shown in FIG. 15, if the designation by the user indicates EC=1 and SC=3, the respective parameters are changed to: EC=2 and SC=1. In other words, the post-processing side is shifted to an adjacent side including the stapling position, without changing the stapling position. Likewise, if EC=1 and SC=1, the respective parameters are changed to: EC=4 and SC=3.

On the other hand, for instance, in the case where a targeted image is a landscape image as shown in FIG. 16, if the designation by the user indicates EC=2 and SC=3, the lead end of the sheet in the sheet transport direction serves as the post-processing side, because the image is rotated counter-clockwise by 90 degrees by the printer driver 18, as mentioned above. In this case, the current indication: EC=2 and SC=3 is changed to: EC=3 and SC=1. In other words, the post-processing side is shifted to an adjacent side including the stapling position, without changing the stapling position. Likewise, if EC=2 and SC=1, the respective parameters are changed to: EC=1 and SC=3.

Generally, if SC=3, the post-processing side identification code EC is incremented by one, and the stapling position identification code SC is decreased from "3" to "1". If SC=1, the post-processing side identification code EC is incremented by three (if EC≧2, the post-processing side identification code EC is decremented by one), and the stapling position identification code SC is increased from "1" to "3".

By applying the aforementioned regularity, the post-processing operation can be simplified.

Referring back to FIG. 14, if the post-processing side coincides with the binding margin in Step S43, in other words, if the routine skips Step S42, the routine proceeds to Step S45. If the post-processing side is located on the right of the binding margin, the routine proceeds to Step S44R. If the post-processing side is located on the left of the binding margin, the routine proceeds to Step S44L.

In Step S44R, rotation angle information relating to the image information stored in the image information memory 12 is changed in such a manner that the image is rotated counterclockwise by 90 degrees, and then, the routine goes to Step S45. In Step S44L, rotation angle information relating to the image information in the image information memory 12 is changed in such a manner that the image is rotated clockwise by 90 degrees, and then, the routine goes to Step S45.

By performing the aforementioned image rotation control, the image writer 15M is operable to form an image in such a manner that the images in all the pages of a post-processed sheet bundle are oriented in a proper position when the pages are opened along the binding side.

As described above referring to FIG. 4, the stapling position identification code SC indicates a stapling position viewed from the point O. Accordingly, the value of the stapling position identification code SC depends exclusively on shifting of the post-processing side with respect to the binding margin in Step S42, without depending on image rotation.

In Step S45, the system controller 11 supplies the contents stored in the image information memory 12 to the image writing controller 15, which, in turn, controls the image writer 15M to form an image on a sheet. In response to a command from the image writing controller 15, the system controller 11 controls the sheet transport controller 16 to cause the sheet transporter 16M to transport the sheet. The system controller 11 supplies the post-processing information to the post-processing controller 17. The post processing controller 17 causes the stapler 17MS or the punch 17MP to perform post-processing under the condition that the requirements for enabling post-processing are satisfied.

As described above, in the first embodiment, the post-processing side of the sheet bundle is designated, based on the combination information relating to combination of discrimination as to whether the post-processing side of the sheet is a long side or a short side of the sheet, and discrimination as to whether the post-processing side of the sheet is a right side, a left side, an upper side, or a lower side of the sheet, depending on a judgment as to whether the image to be formed on the sheet is a portrait image or a landscape image. This is advantageous in allowing the user to easily designate the post-processing side of the sheet bundle.

Also, the user is allowed to designate the stapling position at one end on the designated post-processing side, based on the combination information relating to combination of discrimination as to whether the stapling position is on the left side or the right side of the sheet, and discrimination as to whether the stapling position is on the upper side or the lower side of the sheet. This is advantageous in allowing the user to easily designate the stapling position of the sheet bundle.

Further, the designated stapling position is converted into a code, without depending on the image rotation, which is required to be performed in using a lead end or a tail end of the sheet in the sheet transport direction as the post-processing side. This is advantageous in reducing the number of post-processing patterns, thereby enabling to further simplify the post-processing routine.

In using sheets of a size capable of both longitudinal transport and transverse transport, the post-processing side can be utilized, in place of using the binding margin for determining the page opening direction, and the sheet transport direction can be changed by automatically differentiating the post-processing side from the binding margin depending on the post-processing condition. This enables to automatically change the sheet transport direction depending on the post-processing condition, without making the post-processing designation by the user complicated. Thus, the arrangement greatly contributes to improvement of printing efficiency.

Further, since the post-processing side identification code and the post-processing position identification code in correspondence to the post-processing side are used, the post-processing routine can be further simplified by considerably reducing the number of post-processing patterns, as compared with the conventional arrangement.

Second Embodiment

In this section, a second embodiment of the invention is described. In the following, description is made on an arrangement that post-processing is performed for a sheet bundle of the same size including a portrait image and a landscape image, or a sheet bundle of different sizes having the lengths of one sides thereof identical to each other.

In this embodiment, if the item "CUSTOMIZED SETTING" is selected from the dropdown list shown in FIG. 6A, a customized setting button which has been displayed in a gray-out manner in FIG. 5 is displayed in an enabling manner, as indicated by a custom setting button 29 shown in FIG. 17. When the customized setting button 29 is clicked, a customized post-processing side setting screen shown in FIG. 18 is displayed.

Figure 18:
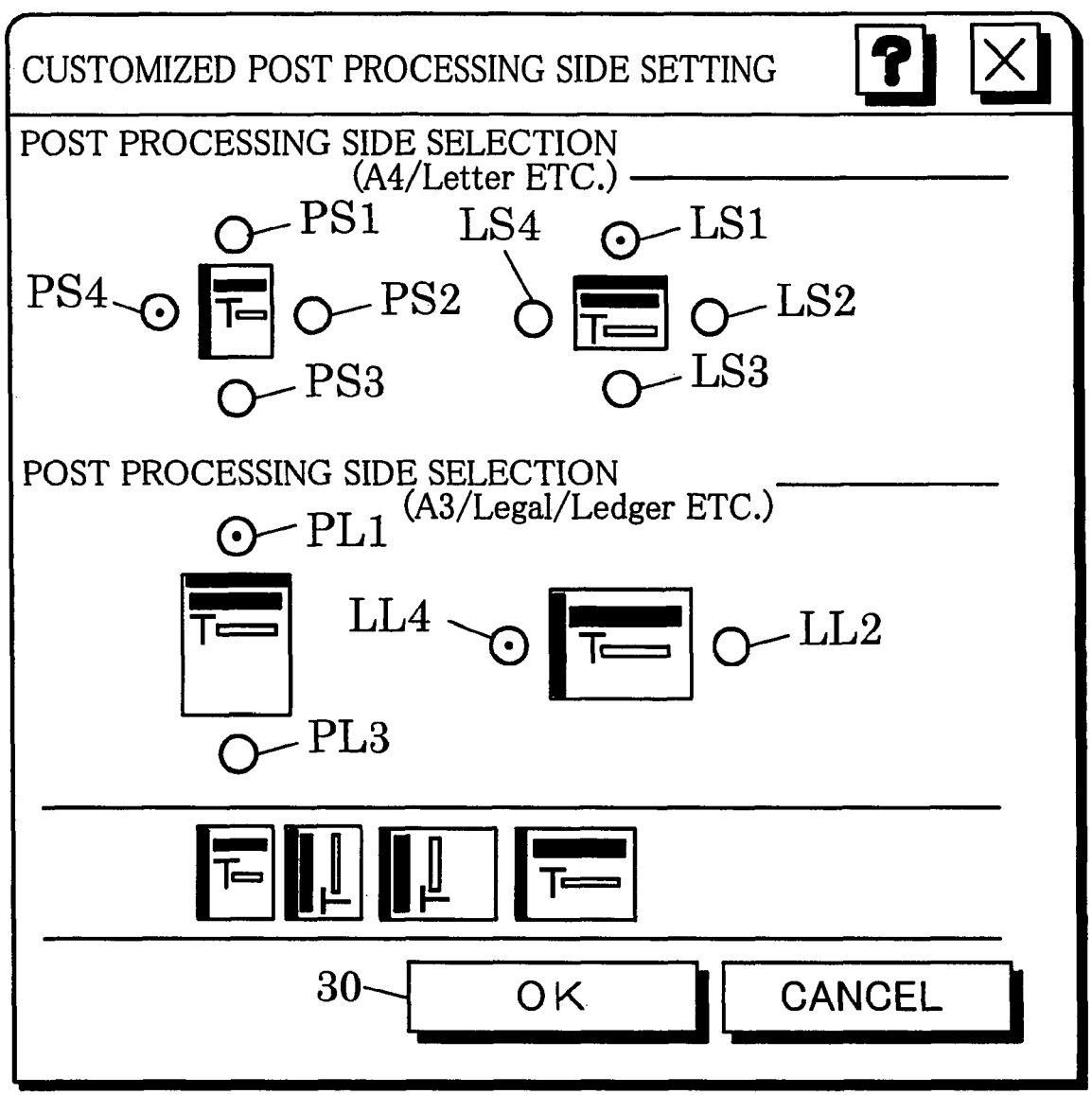
FIG. 18 is a diagram showing a customized post-processing side setting screen.

As shown in FIG. 18, in an upper section of the screen, a portrait image and a landscape image each to be formed on a small-sized sheet capable of performing longitudinal transport and transverse transport are displayed side by side. The letter "T" in the portrait image and the landscape image indicates an orientation of the image. Radio buttons PS1, PS2, PS3, and PS4 are arranged in correspondence to four sides of a sheet for portrait printing, and radio buttons LS1, LS2, LS3, and LS4 are arranged in correspondence to four sides of a sheet for landscape printing. The four radio buttons PS1 through PS4 for portrait printing are grouped so that one of the radio buttons PS1 through PS4 is selectable. Likewise, the four radio buttons LS1 through LS4 for landscape printing are grouped so that one of the radio buttons LS1 through LS4 is selectable. Since the lengths of the post-processing sides of the sheets placed one over the other are required to be identical to each other, if one of the radio buttons PS1 through PS4 is selected, the corresponding one of the radio buttons LS1 through LS4 is restrictively operated in association with the selected radio button, and vice versa, which will be described later.

In the middle section of the screen shown in FIG. 18, a portrait image and a landscape image each to be formed on a large-sized sheet whose short side is selectable as a post-processing side are displayed side by side. Radio buttons PL1 and PL3 are arranged in correspondence to the short sides of a sheet for portrait printing, and radio buttons LL2 and LL4 are arranged in correspondence to the short sides of a sheet for landscape printing. The two radio buttons PL1 and PL3 for portrait printing are grouped so that one of the radio buttons PL1 and PL3 is selectable. Likewise, the two radio buttons LL2 and LL4 for landscape printing are grouped so that one of the radio buttons LL2 and LL4 is selectable. Since merely the short side is selectable in the middle section, unlike the upper section example using the small-sized sheet, there is no restrictive association between the two groups concerning the selected radio button.

When one of the twelve radio buttons is clicked with a pointing device, a black dot is displayed in the designated radio button to show that the designated radio button is in a selected state, and a strip-shaped binding margin is displayed on the side of the designated image corresponding to the designated radio button.

Generally, the long side of a small-sized sheet and the short side of a large-sized sheet are identical to each other in length, as in the case of A4 size sheet and A3 size sheet. However, there is a case that the short side of a large-sized sheet and the short side of a small-sized sheet are identical to each other in length, and the long side of the large-sized sheet and the long side of the small-sized sheet are different from each other in length, as in the case of a letterhead sheet and a legal-sized sheet. The middle section example is also applied to the latter combination.

In the lower section of the screen shown in FIG. 18, four images corresponding to the aforementioned four images in the upper section and the middle section after image rotation are displayed in such a manner that the selected post-processing side is located at a certain side e.g. the left side of the displayed four images. The lengths of the left sides of the displayed images in the lower section are identical to each other. In the four images displayed in the lower section in FIG. 18, the sheet transport direction is a leftward direction or a rightward direction depending on the post-processor such as a stapler or a punch.

Figure 19:
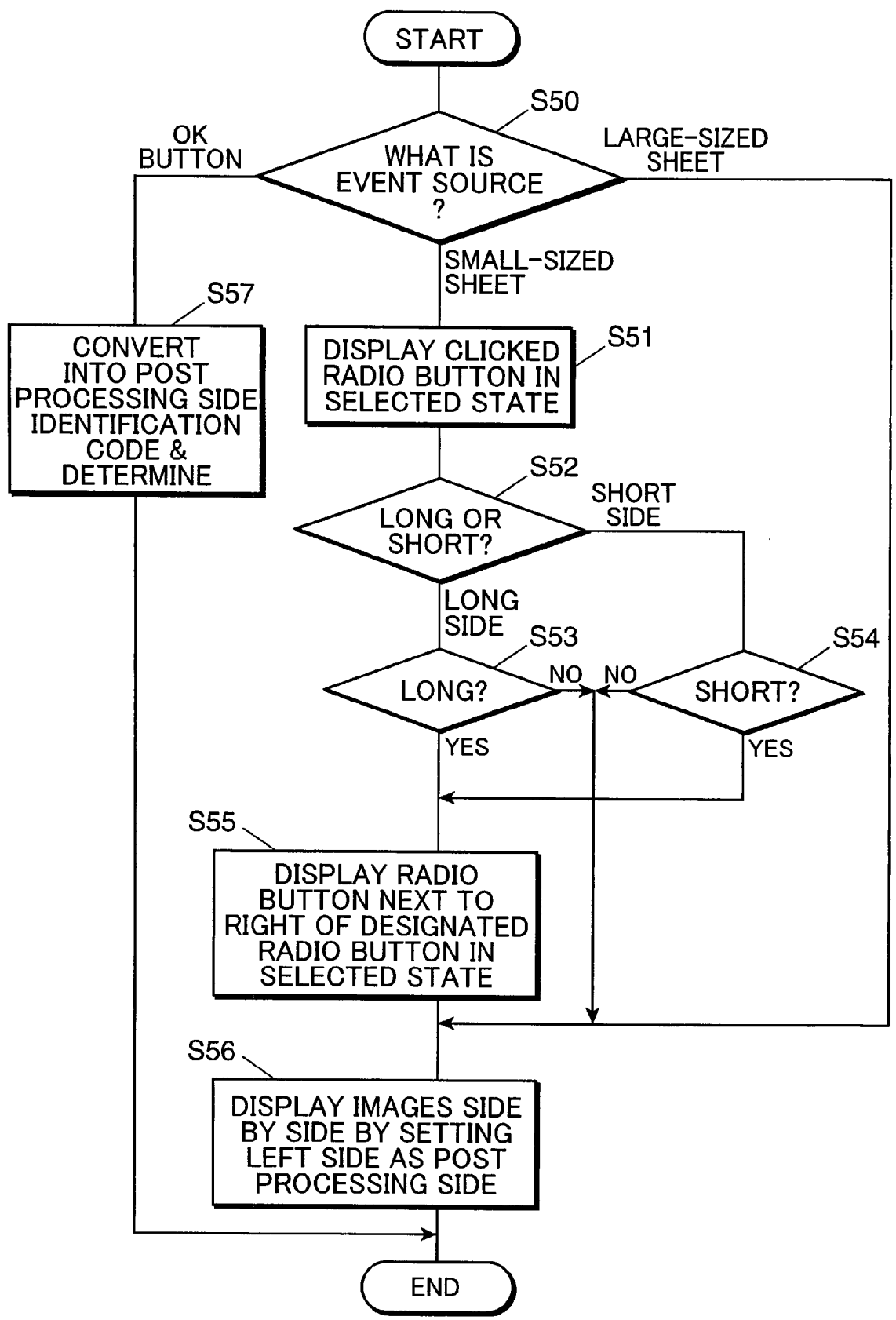
FIG. 19 is a flowchart showing steps to be executed by an event handler which is activated in response to click of a radio button or an OK button.

FIG. 19 is a flowchart showing an operation to be executed by an event handler which is initiated in response to click of one of the radio buttons or an OK button 30 on the screen shown in FIG. 18, with the pointing device.

In Step S50, if the OK button 30 displayed in the lower section in FIG. 18 is clicked with the pointing device ("OK BUTTON" in Step S50), the routine proceeds to Step S57. If one of the radio buttons for selecting the post-processing side of the large-sized sheet in the middle section in FIG. 18 is clicked with the pointing device ("LARGE-SIZED SHEET" in Step S50), the routine proceeds to Step S56. If one of the radio buttons for selecting the post-processing side of the small-sized sheet in the upper section in FIG. 18 is clicked with the pointing device ("SMALL-SIZED SHEET" in Step S50), the routine proceeds to Step S51.

In Step S51, the radio buttons in the group including the clicked radio button are exclusively displayable in a selected state.

In Step S52, if the designated side, corresponding to the selected radio button, of one of the two images in the upper section in FIG. 18 is a long side ("LONG SIDE" in Step S52), the routine proceeds to Step S53. If the designated side is a short side ("SHORT SIDE" in Step S52), the routine proceeds to Step S54.

In Step S53, if the designated side of the counterpart image in the upper section in FIG. 18 is a long side (YES in Step S53), the routine proceeds to Step S55. If the designated side of the counterpart image is not a long side (NO in Step S53), the routine proceeds to Step S56.

In Step S54, if the designated side of the counterpart image in the upper section in FIG. 18 is a short side (YES in Step S54), the routine proceeds to Step S55. If the designated side of the counterpart image is not a short side (NO in Step S54), the routine proceeds to Step S56.

In Step S55, a radio button next to the right of the selected radio button in the counterpart image is displayed in a selected state. For instance, in FIG. 18, if the radio button PS1 is clicked with the pointing device in a state that the radio button PS4 and the radio button LS1 are selected, the radio button PS1 is displayed in a selected state in Step S51. Then, the radio button LS2 is displayed in a selected state in Step S55. Next, if the radio button LS4 is clicked with the pointing device in a state that the radio button PS1 and the radio button LS2 are selected, the radio button LS4 is displayed in a selected state in Step S51. In this case, since the judgment result in Step S54 is negative, the radio button PS1 remains to be displayed in the selected state.

In Step S56, if the selected state in the targeted image in Step S51 is changed, or the selected state in the counterpart image is automatically changed in Step S55 in association with the operation in Step S51, the corresponding image in the lower section on the screen shown in FIG. 18 is shifted to the image where the left side serves as the selected post-processing side by image rotation, and the routine is ended. Then, the printing data to be supplied from the application program via the application program interface of the operating system is changed by the printer driver 18 to comply with the image rotation.

In Step S57, the post-processing side designated on the screen is encoded into the post-processing side identification code EC (see FIG. 3A) with respect to each of the portrait image and the landscape image to be printed on a small-sized sheet and a large-sized sheet, and the codes EC are stored into the setting information memory 13 for determination.

In the case where the screen shown in FIG. 18 is displayed when the customized setting button 29 is clicked again, the screen shows a status that the corresponding radio buttons of the four groups in the upper section and the middle section of the screen shown in FIG. 18 are selected based on the data stored in the setting information memory 13, in other words, the previously set status is displayed.

In FIG. 18, four kinds of images are displayed. Among these images, the radio button(s) having no relation to a print job may be displayed in a selected state. However, the user knows which radio button is necessary for post-processing, and the data relating to the post-processing side corresponding to the irrelevant radio button is not used. Accordingly, no problem is involved in indication of the unnecessary radio button(s).

Referring to FIG. 18, two of the radio buttons LS1 through LS4 are selectable in correspondence to selection of one of the radio buttons PS1 through PS4. Also, one of the radio buttons PL1 and PL3 is selectable in correspondence to the selection of two of the radio buttons LS1 through LS4. Further, one of the radio buttons LL2 and LL4 is selectable in correspondence to the selection of one of the radio buttons PL1 and PL3. Accordingly, thirty-two patterns=4×2×2×2 are provided as combination on selection of the post-processing side. In this embodiment, with the aforementioned selection control, display control, and processing control, the user is allowed to easily and securely select the post-processing side.

In the case where an image display button 26B shown in FIG. 17 is clicked, a post-processing image window 26 showing a post-processed image of a sheet bundle of different sizes is displayed. This enables the user to easily check in advance whether an intended post-processing is attained. The effect to be obtained by clicking a setting value reference list display button 27B in the second embodiment is substantially the same as described in the first embodiment.

The post-processing setting code shown in FIG. 4 with respect to one of sheets of different sizes including the large-sized sheet is supplied to a post-processing controller 17.

Designation on the stapling position and the number of punch holes to be formed on the selected post-processing side in the second embodiment is substantially the same as described in the first embodiment. In the case where post-processing is performed for sheets of different sizes, there is no need of performing the operation shown in FIG. 14, because the post-processing sides of the sheets whose lengths are identical to each other are placed one over the other.

Various modifications other than the first and the second embodiments may be applicable to the invention.

The foregoing embodiments describe an arrangement in which the post-processing side is automatically shifted from a short side to a long side. Alternatively, the post-processing side may be automatically shifted from one of the short side and the long side to the other. For instance, in the case where a designated post-processing side is a long side, and sheets of a size capable of transverse transport are not stored in a sheet cassette of the image forming apparatus, the post-processing side may be automatically shifted from the long side to the short side for image formation.

In the foregoing embodiments, the four sides of a sheet are viewed from the center O of the sheet in FIG. 3A. Alternatively, as far as the four sides are identifiable, the four sides may be viewed from above or below the center O of the sheet, or at positions outside the sheet as opposed to the four sides.

The embodiments describe an arrangement in one-sided printing. It is obvious that the invention is applicable to double-sided printing. In forming an image on the other side of a sheet in double-sided printing, if the image is oriented in a direction orthogonal to the sheet transport direction, rotating the image by 180 degrees enables to orient the images in all pages identical to each other in a proper position when the pages are opened along the biding side of the sheet bundle post-processed by the post-processor.

In the embodiments, the image writer 15M is of a laser electrostatic transfer system. Alternatively, an equivalent device of an ink jet transfer system may be used, as far as the device is capable of forming an image on a sheet.

In the embodiments, if selecting a post-processing position for a certain item is restricted after a post-processing side is selected, the item is displayed in a gray-out manner. Alternatively, the item may be displayed in a different color, or display of the item may be restricted, in place of gray-out display.

Further alternatively, the reference list showing correlation between setting items and setting contents may be displayed within the setting window, or at a position near a site clicked by the right mouse button.

Further alternatively, the invention is applicable to a copier or a facsimile machine, as well as a printer or a complex machine.

The following is a summary of the invention based on the foregoing embodiments.

An image forming apparatus according to an aspect of the invention includes: an image former for forming an image on a sheet based on image data; a post-processor for performing post-processing with respect to the sheet having the image formed by the image former; a post-processing designator for designating a post-processing side of a sheet bundle, and a post-processing position with respect to the post-processing side, as post-processing information; a storage for storing the image data to be supplied to the image former, and the post-processing information designated by the post-processing designator; an image rotator for changing an orientation of the image data stored in the storage in such a manner that a lead end or a tail end of the sheet bundle in a sheet transport direction serves as the post-processing side; and a controller for causing the post-processor to perform the post-processing based on the post-processing information stored in the storage, wherein the post-processing designator identifies four sides of the sheet based on combination information relating to combination of discrimination as to whether the post-processing side is a long side or a short side of the sheet, and discrimination as to whether the post-processing side is a left side, a right side, an upper side, or a lower side of the sheet, depending on whether the image to be formed on the sheet is a portrait image or a landscape image, and designates the post-processing side by using the combination information.

In the image forming apparatus having the above arrangement, the post-processing side of the sheet bundle is designated based on the combination information, depending on whether the image to be formed on the sheet is the portrait image or the landscape image. This enables to simplify the post-processing information, thereby enabling to simplify a post-processing routine.

Preferably, the post-processing to be performed by the post-processor may include a stapling processing with respect to the post-processing side, and the post-processing designator may identify four corners of the sheet based on combination information relating to combination of discrimination as to whether the post-processing side is the left side or the right side of the sheet and discrimination as to whether the post-processing side is the upper side or the lower side of the sheet, and designate a stapling position at one end on the post-processing side as the post-processing position by using the combination information.

In the above arrangement, the stapling position at the one end on the post-processing side can be identified based on the combination information. This allows the user to easily designate the stapling position with respect to the post-processing side of the sheet bundle. Also, this enables to simplify the information relating to the stapling position, thereby enabling to simplify the post-processing routine.

Preferably, the post-processing designator may be operative to convert the designated stapling position into an identification code, independently of change of the orientation of the image data by the image rotator. Further preferably, the identification code may specify whether the designated stapling position is located on a left end or a right end on the post-processing side, viewed from a center of the sheet.

In the above arrangement, the number of codes can be reduced, as compared with an arrangement of using a code depending on change of the orientation of the image data. This is further advantageous in simplifying the post-processing routine.

Preferably, the post-processing to be performed by the post-processor may further include a punching processing with respect to the post-processing side, and the post-processing designator may further designate at least one of punch hole forming/non-forming, and the number of punch holes with respect to the post-processing side, as the post-processing information.

In the above arrangement, since the punch hole forming/non-forming, and the number of punch holes with respect to the post-processing side can be designated as the post-processing information, the post-processing routine can be further advantageously simplified.

Preferably, the post-processing designator may be a host computer to be connected to the controller.

The above arrangement enables to execute processing required for designating the post-processing information at a high speed.

Preferably, the image forming apparatus may further include: a changer for judging whether the post-processing side is shiftable in such a manner that the post-processor is capable of performing the post-processing without changing a post-processing result, if it is judged that the post-processor is incapable of performing the post-processing with respect to the post-processing side, and shifting the post-processing side if the judgment result by the changer is affirmative. Further preferably, if the post-processing side is to be shifted to other side of the sheet including one end on the post-processing side, viewed from a center of the sheet, when the post-processing position is located on the one end on the post-processing side, the changer may be operative to update data relating to the post-processing side stored in the storage from post-processing-side data before the shifting to post-processing-side data after the shifting, and update data relating to the post-processing position stored in the storage from post-processing-position data with respect to the post-processing side before the shifting to post-processing-position data with respect to the post-processing side after the shifting, and the post-processing position with respect to the post-processing side after the shifting may be located at the one end on the post-processing side before the shifting.

In the above arrangement, even if it is judged that the post-processor is incapable of performing post-processing with respect to the currently designated post-processing side, an intended post-processing result can be obtained by shifting the post-processing side. This eliminates a cumbersome operation concerning the post-processing routine.

Preferably, the changer may be operative to store the post-processing side data before the shifting into the storage, as data relating to a binding side, independently of the updating, before the post-processing side data stored in the storage is updated, and change the orientation of the image data stored in the storage in such a manner that the images to be formed on the sheets of the sheet bundle are oriented in the same direction when the sheet bundle post-processed by the post-processor is bound at the binding side.

In the above arrangement, even if the post-processing side is shifted, the post-processing side before the shifting can be defined as the binding side so that the images to be formed on the sheets of the sheet bundle are oriented in the same direction when the sheet bundle post-processed by the post-processor is bound at the binding side.

An operation setting device for use in an image forming apparatus according to another aspect of the invention includes: a processor; a storage, to be connected to the processor, for storing a program to be executed by the processor, and post-processing side identification data representing a post-processing side of a sheet bundle for image formation; an interactive input device to be connected to the processor; and a display device to be connected to the processor, wherein the program causes the processor to execute the following steps: (a) causing the display device to display a post-processing side setting window in response to a command from the interactive input device; (b) arranging, on the post-processing side setting window, a first portrait image and a first landscape image to be formed on respective sheets of a first size side by side, and arranging a first alternative button, a second alternative button, a third alternative button, and a fourth alternative button of a first group respectively in correspondence to four sides of the first-sized sheet where the first portrait image is formed, and a first alternative button, a second alternative button, a third alternative button, and a fourth alternative button of a second group respectively in correspondence to four sides of the first-sized sheet where the first landscape image is formed, and a determination button; (c) in the case where one of the alternative buttons in one of the first group and the second group is selected by a command from the interactive input device, if the alternative button in the other of the first group and the second group, which corresponds to the side having the length different from the length of the side corresponding to the alternative button selected in the one group, has already been selected, automatically updating and displaying one of the alternative buttons adjacent to the previously-selected alternative button in a selected state; and (d) designating, in response to manipulation of the determination button, the sides of the first-sized sheets where the first portrait image and the first landscape image are formed, which are selected by the alternative buttons in the first group and the second group, are respectively designated as the post-processing side of the sheet bundle to determine the post-processing side identification data.

In the operation setting device having the above arrangement, the user is allowed to easily and securely designate one of the multitude possible combinations on the post-processing side of the sheet bundle including the portrait image and the landscape image.

Preferably, the program may further cause the processor to execute a step (e) additionally displaying, on the post-processing side setting window, an image obtained by rotating the first portrait image or the first landscape image in such a manner that the side of the first-sized sheet where the first portrait image is formed, the side being selected by the alternative button in the first group, and the side of the first-sized sheet where the first landscape image is formed, the side being selected by the alternative button in the second group are displayed on the same side on the post-processing side setting window.

In the above arrangement, since the image obtained by rotating the first portrait image or the first landscape image can be additionally displayed, the user is allowed to easily grasp a finishing condition of the sheet bundle after the post-processing.

Preferably, the program may further cause the processor to execute a step: (f) in the step (b), arranging, on the post-processing side setting window, a second portrait image and a second landscape image to be formed on respective sheets of a second size larger than the first size side by side; and arranging a first alternative button and a second alternative button of a third group respectively in correspondence to two short sides of the second-sized sheet where the second portrait image is formed, and a first alternative button and a second alternative button of a fourth group respectively in correspondence to two short sides of the second-sized sheet where the second landscape image is formed.

In the above arrangement, the user is allowed to easily and securely designate one of the multitude possible combinations on the post-processing side, concerning the sheet bundle of different sizes having the lengths of one side thereof identical to each other.

Preferably, the program may further cause the processor to execute a step: (g) additionally arranging, on the post-processing side setting window, an image obtained by rotating the first portrait image or the first landscape image, and an image obtained by rotating the second portrait image or the second landscape image in such a manner that: the side of the first-sized sheet where the first portrait image is formed, the side being selected by the alternative button in the first group;

the side of the first-sized sheet where the first landscape image is formed, the side being selected by the alternative button in the second group; the side of the second-sized sheet where the second portrait image is formed, the side being selected by the alternative button in the third group; and the side of the second-sized sheet where the second landscape image is formed, the side being selected by the alternative button in the fourth group are displayed on the same side on the post-processing side setting window.

In the above arrangement, the user can easily grasp a finishing condition of the sheet bundle of different sizes, as well as the sheet bundle of the same size.

An image forming apparatus according to yet another aspect of the invention includes the aforementioned operation setting device.

The above arrangement enables to realize the image forming apparatus having the above effects.

An image forming system according to a further aspect of the invention includes the aforementioned image forming apparatus, and a computer to be connected to the image forming apparatus, wherein the image forming apparatus is a printer, and the program of the operation processing device is a printer driver to be executed by the computer.

The above arrangement enables to realize the printer having the above effects.

An operation setting device for use in an image forming apparatus according to a yet further aspect of the invention includes: a processor; a storage to be connected to the processor, for storing a program to be executed by the processor, and setting data to be set in the image forming apparatus; an interactive input device to be connected to the processor; and a display device to be connected to the processor, wherein the program causes the processor to execute the following steps: (a) causing the display device to display a setting screen having multiple pages; (b) causing the display device to display a selected page of the multiple pages in the setting screen, in response to a command of selecting the page from the interactive input device; (c) changing setting contents relating to a setting item corresponding to a setting command on the selected page, in response to the setting command from the interactive input device; (d) causing the display device to display a reference list showing correlation between setting items on the multiple pages, and setting contents corresponding to the setting items, independently of the page selection, and changing the setting contents in the reference list in association with the changing operation in the step (c); and (e) updating the setting data stored in the storage in correspondence to the setting contents in the reference list displayed in the step (d), in response to a determination command from the interactive input device.

In the operation processing device having the above arrangement, since the setting items and the setting contents corresponding to the setting items are displayed as the reference list, independently of the page selection, the user can easily check in advance the setting item whose setting contents has been changed.

Preferably, the setting screen having the multiple pages may be displayed in a first window, the reference list may be displayed in a second window smaller than the first window in size, and a second window display button for displaying the second window may be displayed in the first window, wherein the program further causes the processor to execute a step (f) causing the display device to display the second window, in response to manipulation of the second window display button.

In the above arrangement, a relatively small-sized reference list can be displayed according to needs.

Preferably, the operation setting device may be a computer to be connected to the image forming apparatus, the image forming apparatus may be a printer, the program may be a printer driver, and the setting screen having the multiple pages may include a post-processing setting screen.

The above arrangement enables to realize a printer capable of performing post-processing setting at a high speed.

An image forming system according to a yet further aspect of the invention includes, an image forming apparatus, and the operation setting device of claim 16 to be connected to the image forming apparatus.

The above arrangement enables to realize the image forming system having the above effects.

In an image forming apparatus driver for functioning an operation setting device for use in an image forming apparatus as a computer, according to a yet further aspect of the invention, the computer includes: a storage for storing the image forming apparatus driver, and setting data to be set in the image forming apparatus; an interactive input device; and a display device, the image forming apparatus driver causes the computer to execute the following steps: (a) causing the display device to display a setting screen having multiple pages; (b) causing the display device to display a selected page of the multiple pages in the setting screen, in response to a command of selecting the page from the interactive input device; (c) changing setting contents relating to a setting item corresponding to a setting command on the selected page, in response to the setting command from the interactive input device; (d) causing the display device to display a reference list showing correlation between setting items on the multiple pages, and setting contents corresponding to the setting items, independently of the page selection, and changing the setting contents in the reference list in association with the changing operation in the step (c); and (e) updating the setting data stored in the storage in correspondence to the setting contents in the reference list displayed in the step (d), in response to a determination command from the interactive input device.

In the image forming apparatus driver having the above arrangement, since the setting items and the setting contents corresponding to the setting items are displayed as the reference list, independently of the page selection, the user can easily check in advance the setting item whose setting contents has been changed.

Preferably, the setting screen having the multiple pages may be displayed in a first window, the reference list may be displayed in a second window smaller than the first window in size, and a second window display button for displaying the second window may be displayed in the first window, wherein the image forming apparatus driver further causes the computer to execute a step (f) causing the display device to display the second window, in response to manipulation of the second window display button.

In the above arrangement, a relatively small-sized reference list can be displayed according to needs.

Preferably, the image forming apparatus may be a printer, the image forming apparatus driver may be a printer driver, and the setting screen having the multiple pages may include a post-processing setting screen.

The above arrangement enables to realize the printer capable of performing post-processing setting at a high speed.

An operation setting device for use in an image forming apparatus according to a yet further aspect of the invention includes: a processor; a storage, to be connected to the processor, for storing a program to be executed by the processor, and post-processing setting restriction information relating to a post-processing position or the number of punch holes, respectively, whose setting is restricted with respect to a post-processing side of a sheet bundle for image formation; an interactive input device to be connected to the processor; and a display device to be connected to the processor, wherein the program causes the processor to execute the following steps: (a) causing the display device to display a post-processing side setting page, in response to a command from the interactive input device; (b) arranging, on the post-processing side setting page, a post-processing side selector for selecting the post-processing side of the sheet bundle, and a post-processing setting selector for selecting the post-processing position or the number of punch holes respectively with respect to the post-processing side; (c) if the post-processing side is selected by the post-processing side selector, judging whether the post-processing position or the number of punch holes, respectively, as a selection item selectable by the post-processing setting selector with respect to the selected post-processing side, is a restricted item, based on the post-processing setting restriction information; (d) enabling selection of the selection item whose selection is judged not to be restricted in the step (c) as an ordinary indication, and disabling selection of the selection item whose selection is judged to be restricted in the step (c) as a non-ordinary indication or non-display; and (e) determining post-processing setting with respect to the sheet bundle, based on the post-processing side selected by the post-processing side selector, and the post-processing position or the number of punch holes respectively selected by the post-processing setting selector.

In the operation setting device having the above arrangement, since the selection item whose setting is restricted with respect to the post-processing side of the sheet bundle can be displayed in selecting the post-processing side, the post-processing routine can be simplified.

Preferably, the non-ordinary indication in the step (d) may be gray-out display.

The above arrangement is further advantageous in displaying the selection item whose setting is restricted.

Preferably, the post-processing setting side page may be one of multiple pages in a setting screen, and the program may further cause the processor to execute the following steps: (f) causing the display device to display the setting screen having the multiple pages; (g) causing the display device to display a selected page of the multiple pages in the setting screen, in response to a command of selecting the page from the interactive input device; and (h) causing the display device to display a reference list showing correlation between setting items on the multiple pages, and setting contents corresponding to the setting items, independently of the page selection.

In the above arrangement, since the setting items on the multiple pages and the setting contents corresponding to the setting items are displayed as the reference list, independently of the page selection, the setting item whose setting is restricted can be further advantageously displayed.

Preferably, the operation setting device may be a computer to be connected to the image forming apparatus, and the program may be an image forming apparatus driver.

The above arrangement enables to perform processing required for post-processing setting at a high speed.

An image forming system according to a further aspect of the invention includes an image forming apparatus, and the aforementioned operation setting device to be connected to the image forming apparatus.

The above arrangement enables to realize the image forming system having the above effects.

In an image forming apparatus driver for functioning an operation setting device for use in an image forming apparatus as a computer, according to a further aspect of the invention, the computer includes: a storage for storing the image forming apparatus driver, and post-processing setting restriction information relating to a post-processing position or the number of punch hole, respectively, whose setting is restricted with respect to a post-processing side of a sheet bundle for image formation; an interactive input device; and a display device, the image forming apparatus driver causes the computer to execute the following steps: (a) causing the display device to display a post-processing side setting page, in response to a command from the interactive input device; (b) arranging, on the post-processing setting side page, a post-processing side selector for selecting the post-processing side of the sheet bundle, and a post-processing setting selector for selecting a post-processing position or the number of punch holes respectively with respect to the post-processing side; (c) if the post-processing side is selected by the post-processing side selector, judging whether the post-processing position or the number of punch holes, respectively, as a selection item selectable by the post-processing setting selector with respect to the selected post-processing side, is a restricted item, based on the post-processing setting restriction information; (d) enabling selection of the selection item whose selection is judged not to be restricted in the step (c) as an ordinary indication, and disabling selection of the selection item whose selection is judged to be restricted in the step (c) as a non-ordinary indication or non-display; and (e) determining post-processing setting with respect to the sheet bundle, based on the post-processing side selected by the post-processing side selector, and the post-processing position or the number of punch holes respectively selected by the post-processing setting selector.

In the image forming apparatus driver having the above arrangement, since the selection item whose setting is restricted with respect to the post-processing side of the sheet bundle can be displayed in selecting the post-processing side, the post-processing routine can be simplified.

An image forming apparatus according to still another aspect of the invention includes: a processor; a storage for storing a program to be executed by the processor, and post-processing setting restriction information relating to a post-processing position or the number of punch holes, respectively, whose setting is restricted with respect to a post-processing side of a sheet bundle for image formation; and an operation panel to be connected to the processor, the operation panel including an input device and a display device, wherein the program causes the processor to execute the following steps: (a) causing the display device to display a post-processing side setting page, in response to a command from the input device; (b) arranging, on the post-processing side setting page, a post-processing side selector for selecting the post-processing side of the sheet bundle, and a post-processing setting selector for selecting the post-processing position or the number of punch holes respectively with respect to the post-processing side; (c) if the post-processing side is selected by the post-processing side selector, judging whether the post-processing position or the number of punch holes, respectively, as a selection item selectable by the post-processing setting selector with respect to the selected post-processing side, is a restricted item, based on the post-processing setting restriction information; (d) enabling selection of the selection item whose selection is judged not to be restricted in the step (c) as an ordinary indication, and disabling selection of the selection item whose selection is judged to be restricted in the step (c) as a non-ordinary indication or non-display; and (e) determining post-processing setting with respect to the sheet bundle, based on the post-processing side selected by the post-processing side selector, and the post-processing position or the number of punch holes respectively selected by the post-processing setting selector.

In the image forming apparatus having the above arrangement, since the selection item whose setting is restricted with respect to the post-processing side of the sheet bundle can be displayed in selecting the post-processing side, the post-processing routine can be simplified.

This application is based on Japanese Patent Application No. 2006-278942, No. 2006-278943, No. 2006-278944, and No. 2006-278945 filed on Oct. 12, 2006, respectively, the contents of which are hereby incorporated by reference.

Although the invention has been appropriately and fully described by way of examples with reference to the accompanying drawings, it is to be understood that various changes and/or modifications will be apparent to those skilled in the art. Therefore, unless otherwise such changes and/or modifications depart from the scope of the present invention hereinafter defined, they should be construed as being included therein.

What is claimed is:

1. An operation setting device for use in an image forming apparatus, comprising:
    a processor;
    a storage, to be connected to the processor, for storing a program to be executed by the processor, and post-processing side identification data representing a post-processing side of a sheet bundle for image formation;
    an interactive input device to be connected to the processor; and
    a display device to be connected to the processor, wherein the program causes the processor to execute the following steps:
    (a) causing the display device to display a post-processing side setting window in response to a command from the interactive input device;
    (b) arranging, on the post-processing side setting window:
        a first portrait image side by side with a first landscape image to be formed on respective sheets of a first size,
        a first group of four alternative buttons respectively in correspondence to four sides of the first-sized sheet where the first portrait image is formed,
        a second group of four alternative buttons respectively in correspondence to four sides of the first-sized sheet where the first landscape image is formed,
        a second portrait image side by side with a second landscape image to be formed on respective sheets of a second size larger than the first size,
        a third group of two alternative buttons respectively in correspondence to two short sides of the second-sized sheet where the second portrait image is formed,
        a fourth group of two alternative buttons respectively in correspondence to two short sides of the second-sized sheet where the second landscape image is formed, and
        a determination button;
    (c) in a case where one of the alternative buttons in one of the first and second groups is selected by a command from the interactive input device, and if a previously selected alternative button in the other of the first and second groups corresponds to a side having a length different from a length of the side corresponding to the alternative button selected in the one group, automatically updating and displaying the alternative button in the other group corresponding to the alternative button selected in the one group;
    (d) designating, in response to manipulation of the determination button, the sides of the first-sized sheets where the first portrait image and the first landscape image are formed, which are selected by the alternative buttons in the first group and the second group, are respectively designated as the post-processing side of the sheet bundle to determine the post-processing side identification data; and
    (e) additionally displaying, on the post-processing side setting window, images corresponding to the first portrait image, the first landscape image, the second portrait image and the second landscape image with at least one of the additionally displayed images being rotated so that the sides of all four of the additionally displayed images selected by the alternative buttons are displayed on the same side on the post-processing side setting window, and wherein
    the steps (b) to (e) are performed in a state that the post-processing side setting window is displayed on the display device.

2. An image forming apparatus, comprising the operation setting device of claim 1.

3. An image forming system, comprising:
    the image forming apparatus of claim 2; and
    a computer to be connected to the image forming apparatus, wherein
    the image forming apparatus is a printer, and
    the program of the operation processing device is a printer driver to be executed by the computer.

* * * * *